(12) United States Patent
Tay

(10) Patent No.: US 8,174,593 B2
(45) Date of Patent: May 8, 2012

(54) METHOD AND APPARATUS FOR DETECTING IMAGE DARKENING DUE TO RESET DROOP

(76) Inventor: Hiok-Nam Tay, Singapore (SG)

( * ) Notice: Subject to any disclaimer, the term of this patent is extended or adjusted under 35 U.S.C. 154(b) by 597 days.

(21) Appl. No.: 12/205,084

(22) Filed: Sep. 5, 2008

(65) Prior Publication Data

US 2009/0059044 A1 Mar. 5, 2009

Related U.S. Application Data

(60) Provisional application No. 60/967,657, filed on Sep. 5, 2007, provisional application No. 60/967,651, filed on Sep. 5, 2007.

(51) Int. Cl.
*H04N 3/14* (2006.01)

(52) U.S. Cl. ........................................ 348/294

(58) Field of Classification Search ............... 348/294, 348/300, 246
See application file for complete search history.

(56) References Cited

U.S. PATENT DOCUMENTS

| | | | |
|---|---|---|---|
| 6,831,689 B2 * | 12/2004 | Yadid-Pecht | 348/297 |
| 7,339,621 B2 * | 3/2008 | Fortier | 348/308 |
| 7,397,505 B2 * | 7/2008 | Brehmer et al. | 348/243 |
| 7,432,967 B2 * | 10/2008 | Bechtel et al. | 348/294 |
| 7,702,179 B2 * | 4/2010 | Ting | 382/275 |
| 7,872,682 B2 * | 1/2011 | Rysinski et al. | 348/297 |
| 7,880,779 B2 * | 2/2011 | Storm | 348/241 |
| 2006/0119717 A1 * | 6/2006 | Barna | 348/300 |
| 2006/0262211 A1 * | 11/2006 | Kido | 348/308 |
| 2006/0278809 A1 * | 12/2006 | Takayanagi | 250/208.1 |
| 2007/0146539 A1 * | 6/2007 | Kawahara et al. | 348/370 |

* cited by examiner

*Primary Examiner* — Lin Ye
*Assistant Examiner* — Amy Hsu
(74) *Attorney, Agent, or Firm* — Irell & Manella, LLP; Ben Yorks

(57) ABSTRACT

A method for determining whether a image pixel of an image comprising a plurality of image pixels generated from a pixel array of an image sensor, each having an image pixel value formed from a respective reset level, has suffered a darkening resulting from a drop in its reset level prior to sampling due to a high intensity illumination. Where a first image pixel has its reset level detected to have crossed a threshold and a second image pixel is saturated, a third image pixel between the first and second image pixels is determined to have suffered such darkening if it is not saturated and if no intervening image pixel between the first and the third image pixels either is saturated or is generated from a reset level detected to have crossed a threshold. The crossing of the reset level may be signaled by a reserved codeword.

5 Claims, 27 Drawing Sheets

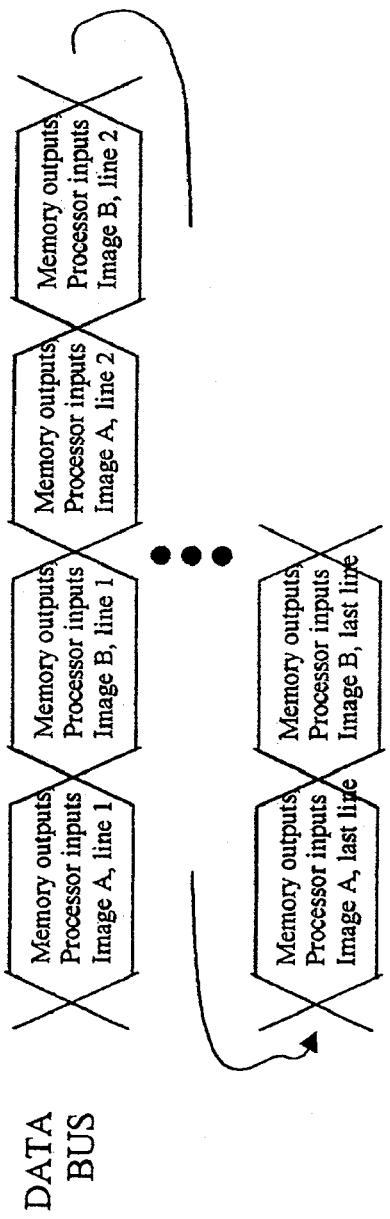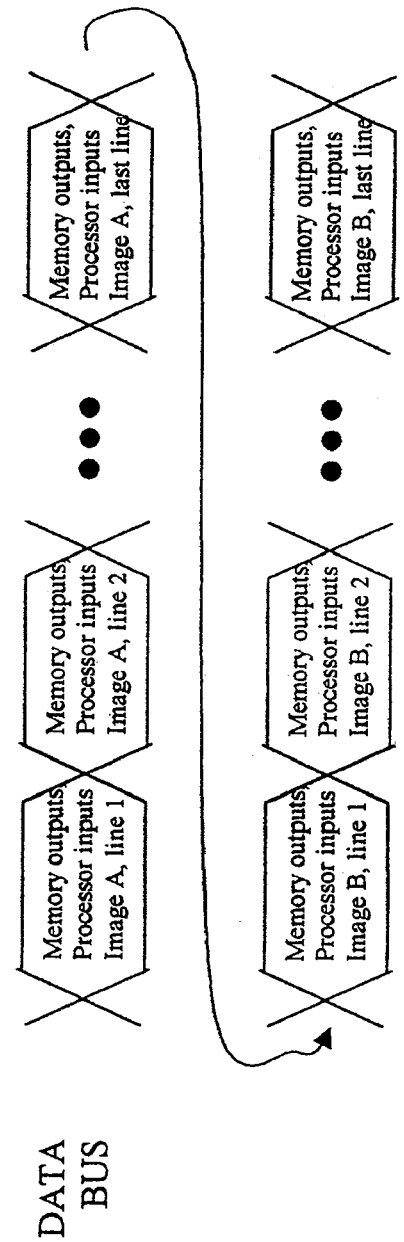

METHOD AND APPARATUS FOR DETECTING IMAGE DARKENING DUE TO RESET DROOP

REFERENCE TO CROSS RELATED APPLICATION

This application claims priority to Application No. 60/967,657 filed on Sep. 5, 2007, and Application No. 60/967,651 filed on Sep. 5, 2007.

BACKGROUND OF THE INVENTION

1. Field of the Invention

The subject matter disclosed generally relates to the field of semiconductor image sensors.

2. Background Information

Photographic equipment such as digital cameras and digital camcorders contain electronic image sensors that capture light for processing into a still or video image, respectively. There are two primary types of electronic image sensors, charge coupled devices (CCDs) and complimentary metal oxide semiconductor (CMOS) sensors. CCD image sensors have relatively high signal to noise ratios (SNR) that provide quality images. Additionally, CCDs can be fabricated to have pixel arrays that are relatively small while conforming with most camera and video resolution requirements. A pixel is the smallest discrete element of an image. For these reasons, CCDs are used in most commercially available cameras and camcorders.

CMOS sensors are faster and consume less power than CCD devices. Additionally, CMOS fabrication processes are used to make many types of integrated circuits. Consequently, there is a greater abundance of manufacturing capacity for CMOS sensors than CCD sensors.

The image sensor is typically connected to an external processor and external memory. The external memory stores data from the image sensor. The processor processes the stored data. It is desirable to provide a low noise, high speed, high resolution image sensor that can utilize external memory and provide data to the processor in an efficient manner.

BRIEF SUMMARY OF THE INVENTION

An image sensor with a pixel array that includes at least one pixel. The sensor may also include a circuit that is connected to the pixel and provides a final image pixel value that is a function of a sampled reset output signal subtracted from a sampled light response output signal that are generated from the pixel. The final image pixel value is set to a maximum value if the sampled reset output signal exceeds a threshold. The final image may be a function of first, second and/or third images and a field that provides information on whether the final image includes a first exposure rate, a second exposure rate and/or a third exposure rate.

BRIEF DESCRIPTION OF THE DRAWINGS

FIG. 6 is an illustration of alternate method for retrieving and combining pixel data;

FIG. 7 is an illustration of alternate method for retrieving and combining pixel data;

DETAILED DESCRIPTION

Disclosed is an image sensor that has one or more pixels within a pixel array. The pixel array may be coupled to a control circuit and a subtraction circuits. The control circuit may cause each pixel to provide a first reference output signal and a reset output signal. The control circuit may then cause each pixel to provide a light response output signal and a second reference output signal. The light response output signal corresponds to the image that is to be captured by the sensor.

The subtraction circuit may provide a difference between the reset output signal and the first reference output signal to create a noise signal that is stored in an external memory. The subtraction circuit may also provide a difference between the light response output signal and the second reference output signal to create a normalized light response output signal. The noise signal is retrieved from memory and combined with the normalized light response output signal to generate the output data of the sensor. The output data may be set to a maximum value if the reset signal exceeds a threshold, indicative of being exposed to sunlight or reflection from a mirror. The final image may be a function of first, second, third and fourth images. The image data may be transferred to a processor with a field that provides information on the exposure rate of the image data.

Figure 1:
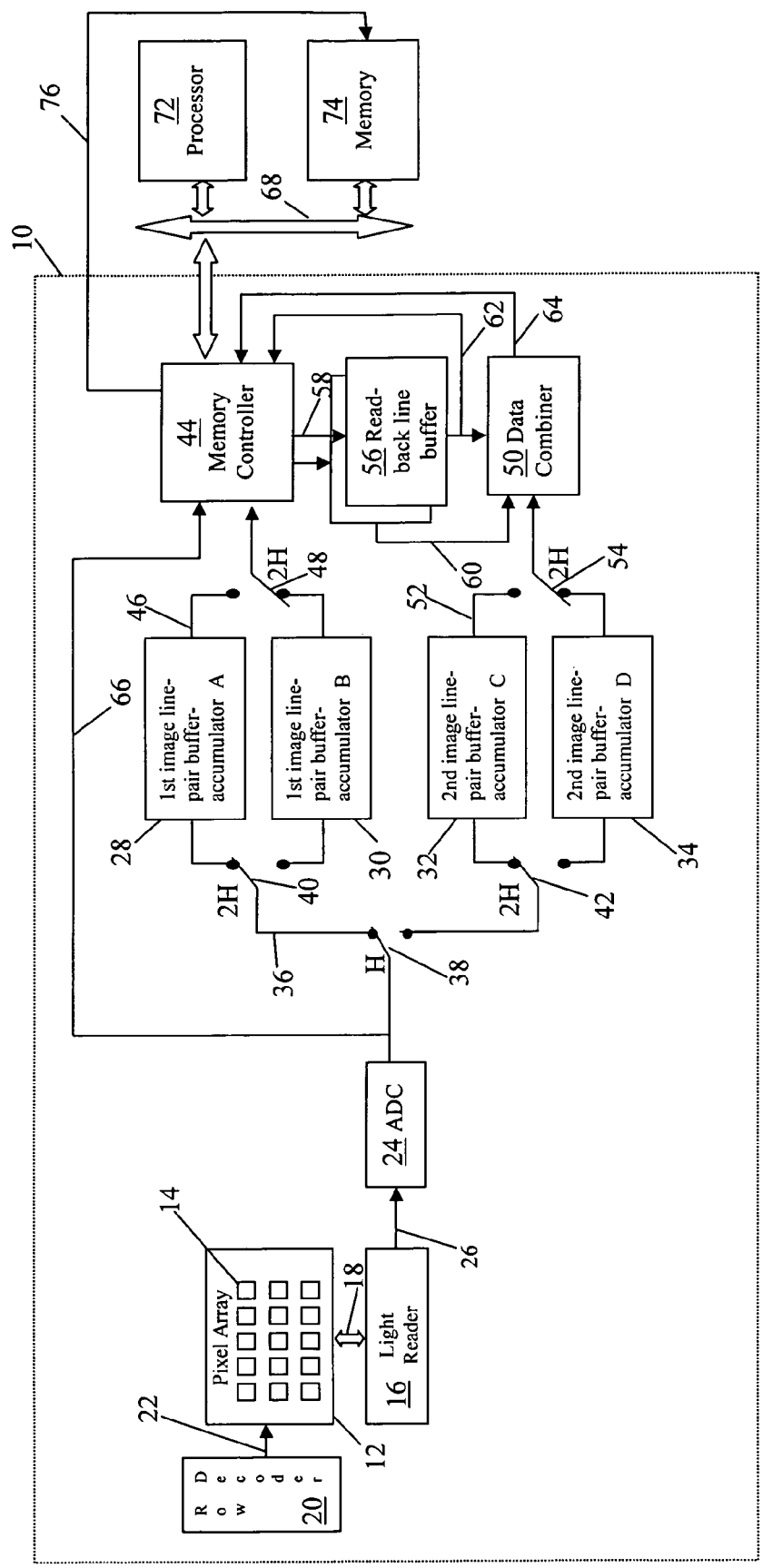
FIG. 1 is a schematic of an embodiment of an image sensor.

Referring to the drawings more particularly by reference numbers, FIG. 1 shows an image sensor 10. The image sensor 10 includes a pixel array 12 that contains a plurality of individual photodetecting pixels 14. The pixels 14 are arranged in a two-dimensional array of rows and columns.

The pixel array 12 is coupled to a light reader circuit 16 by a bus 18 and to a row decoder 20 by control lines 22. The row decoder 20 can select an individual row of the pixel array 12. The light reader 16 can then read specific discrete columns within the selected row. Together, the row decoder 20 and light reader 16 allow for the reading of an individual pixel 14 in the array 12.

The light reader 16 may be coupled to an analog to digital converter 24 (ADC) by output line(s) 26. The ADC 24 generates a digital bit string that corresponds to the amplitude of the signal provided by the light reader 16 and the selected pixels 14.

The ADC 24 is coupled to a pair of first image buffers 28 and 30, and a pair of second image buffers 32 and 34 by lines 36 and switches 38, 40 and 42. The first image buffers 28 and 30 are coupled to a memory controller 44 by lines 46 and a switch 48. The memory controller 44 can more generally be referred to as a data interface. The second image buffers 32 and 34 are coupled to a data combiner 50 by lines 52 and a switch 54. The memory controller 44 and data combiner 50 are connected to a read back buffer 56 by lines 58 and 60, respectively. The output of the read back buffer 56 is connected to the controller 44 by line 62. The data combiner 50 is connected to the memory controller 44 by line 64. Additionally, the controller 44 is connected to the ADC 24 by line 66.

The memory controller 44 is coupled to an external bus 68 by a controller bus 70. The external bus 68 is coupled to an external processor 72 and external memory 74. The bus 70, processor 72 and memory 74 are typically found in existing digital cameras, cameras and cell phones. The processor can perform various computations typically associated with processing images. For example, the processor can perform white balancing or coloring compensation, or image data compression such as compression under the JPEG or MPEG compression standards.

To capture a still picture image, the light reader 16 retrieves a first image of the picture from the pixel array 12 line by line. The switch 38 is in a state that connects the ADC 24 to the first image buffers 28 and 30. Switches 40 and 48 are set so that data is entering one buffer 28 or 30 and being retrieved from the other buffer 30 or 28 by the memory controller 44. For example, the second line of the pixel may be stored in buffer 30 while the first line of pixel data is being retrieved from buffer 28 by the memory controller 44 and stored in the external memory 74.

Figure 2:
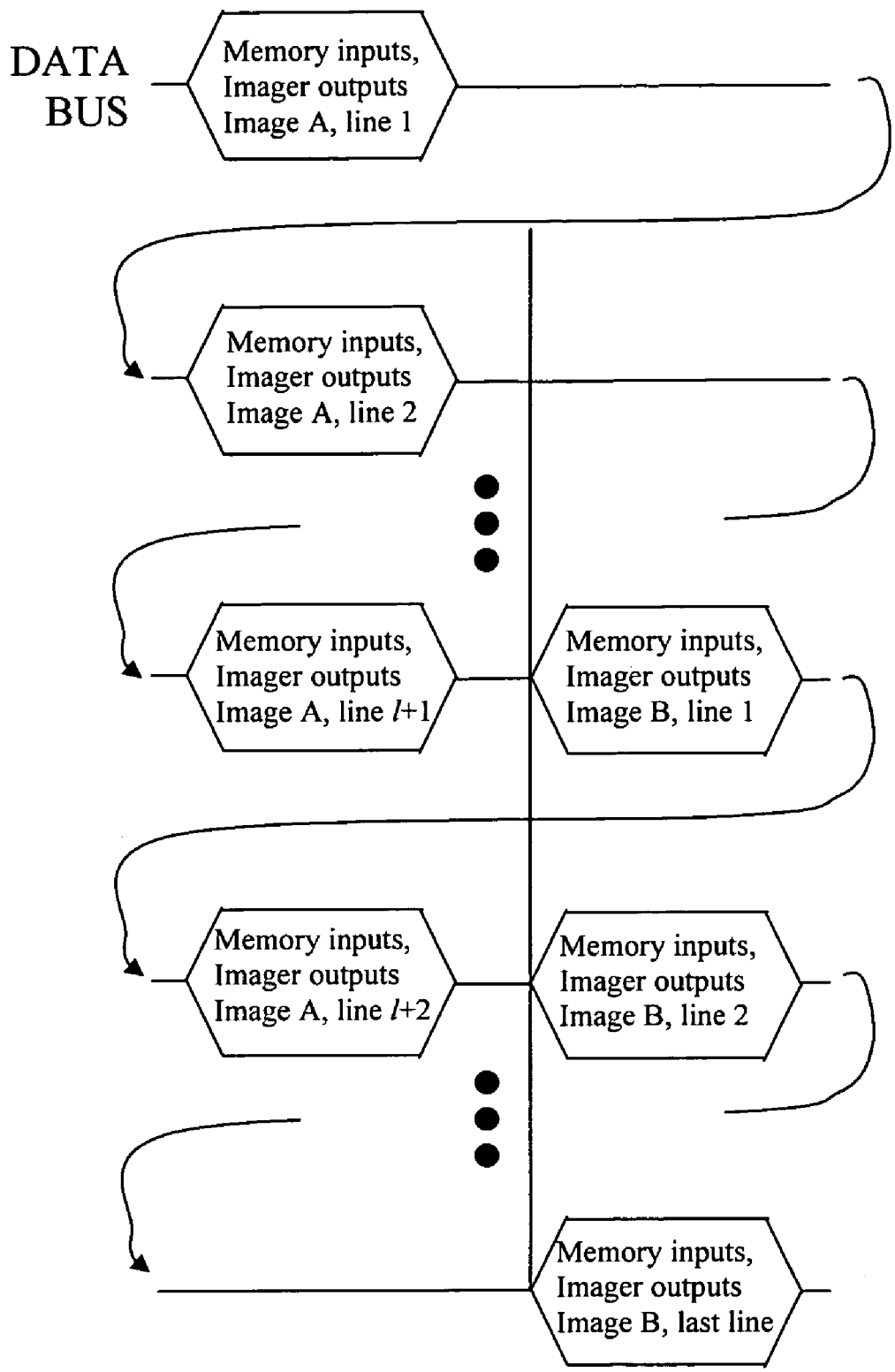
FIG. 2 is an illustration of a method for storing pixel data in an external memory for a still image.

When the first line of the second image of the picture is available the switch 38 is selected to alternately store first image data and second image data in the first 28 and 30, and second 32 and 34 image buffers, respectively. Switches 48 and 54 may be selected to alternatively store first and second image data into the external memory 74 in an interleaving manner. This process is depicted in FIG. 2.

Figure 3:
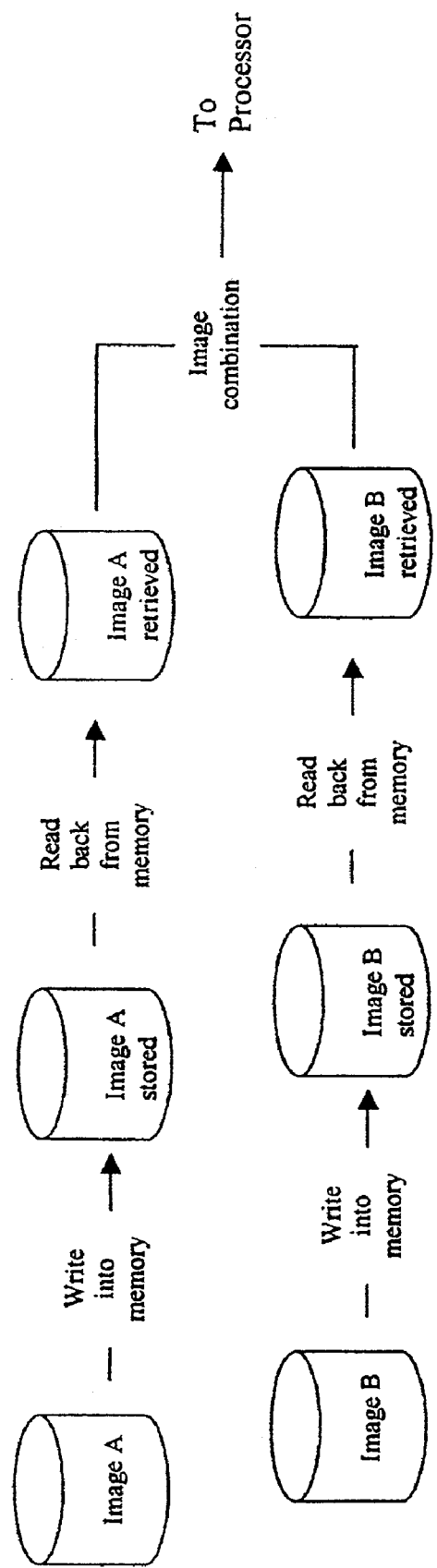
FIG. 3 is an illustration of a method for retrieving and combining pixel data for a still image.

There are multiple methods for retrieving and combining the first and second image data. As shown in FIG. 3, in one method each line of the first and second images are retrieved from the external memory 74 at the memory data rate, stored in the read back buffer 56, combined in the data combiner 50 and transmitted to the processor 72 at the processor data rate. Alternatively, the first and second images may be stored in the read back buffer 56 and then provided to the processor 72 in an interleaving or concatenating manner without combining the images in the combiner 50. This technique allows the processor 72 to process the data manner in different ways.

Figure 4:
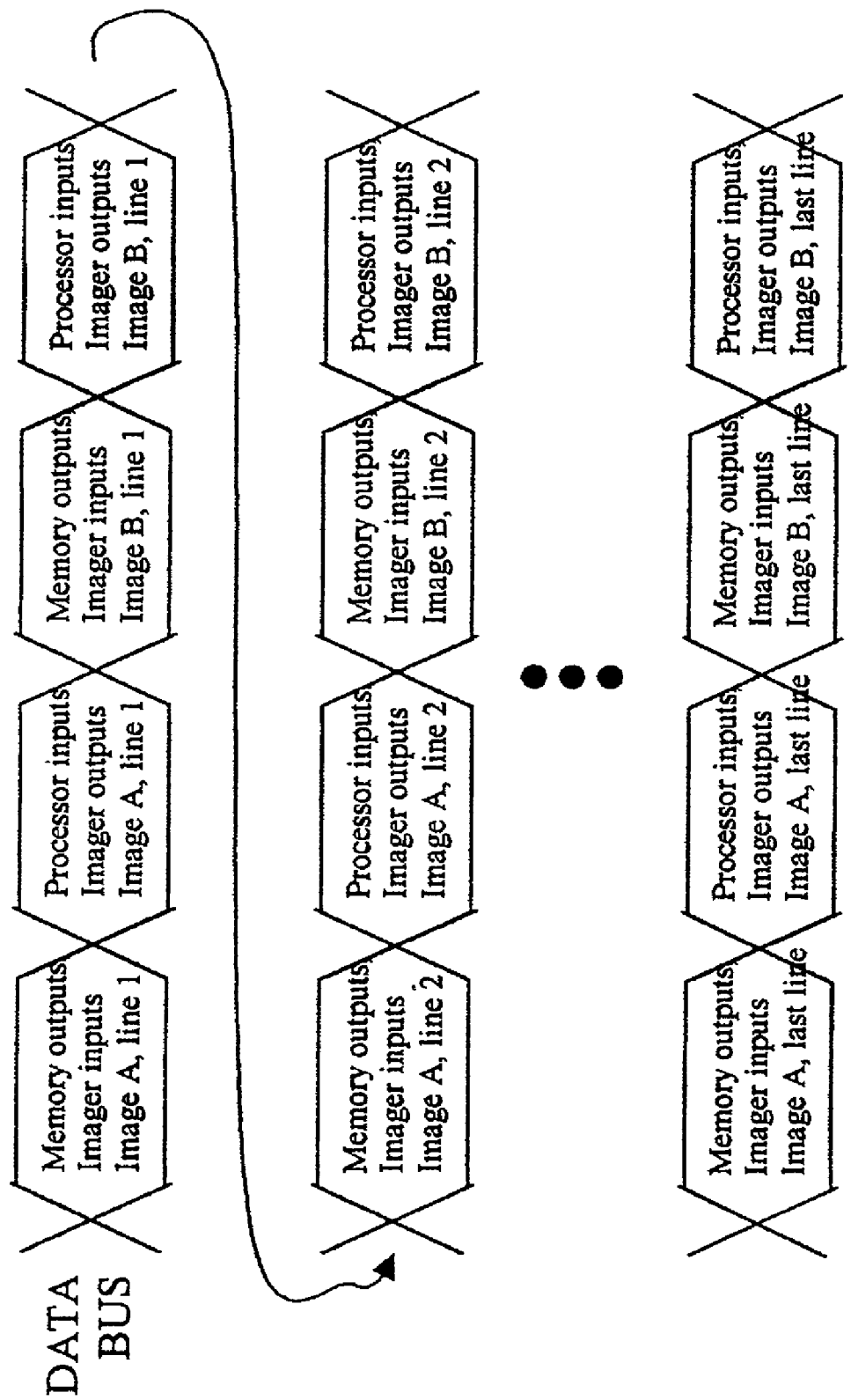
FIG. 4 is an illustration of an alternate method for retrieving and combining pixel data.
Figure 5:
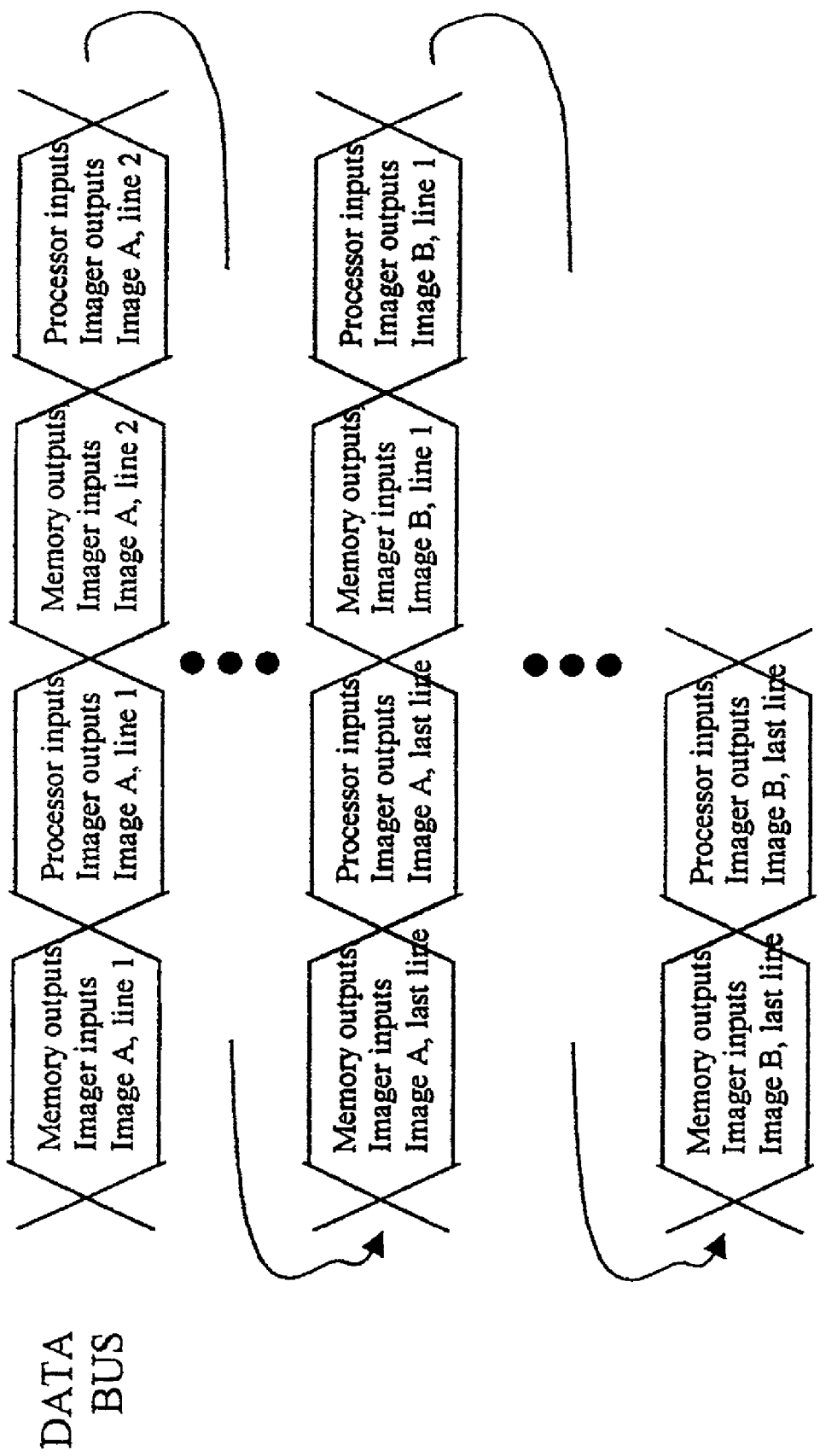
FIG. 5 is an illustration of alternate method for retrieving and combining pixel data.

FIG. 4 shows an alternative method wherein the external processor 72 combines the pixel data. A line of the first image is retrieved from the external memory 74 and stored in the read back buffer 56 at the memory data rate and then transferred to the external processor 72 at the processor data rate. A line of the second image is then retrieved from the external memory 74, stored in the read back buffer 56, and transferred to the external processor 72. This sequence continues for each line of the first and second images. Alternatively, the entire first image may be retrieved from the external memory 74, stored in the read back buffer 56 and transferred to the external processor 72, one line at a time, as shown in FIG. 5. Each line of the second image is then retrieved from the external memory 74, stored in the read back buffer 56 and transferred to the external processor 72.

In the event the processor data rate is the same as the memory data rate the processor 72 may directly retrieve the pixel data rate from the external memory 74 in either an interleaving or concatenating manner as shown in FIGS. 6 and 7, respectively. For all of the techniques described, the memory controller 44 provides arbitration for data transfer between the image sensor 10, the processor 72 and memory 74. To reduce noise in the image sensor 10, the controller 44 preferably transfers data when the light reader 16 is not retrieving output signals.

Figure 8:
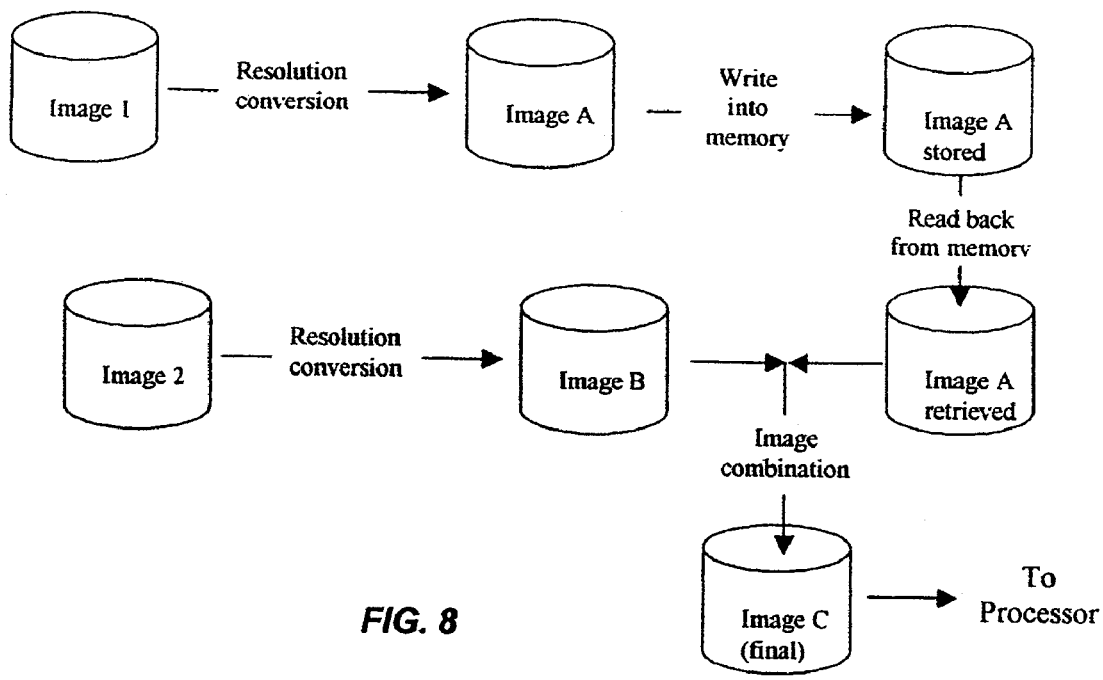
FIG. 8 is an illustration showing a method for storing and combining pixel data for a video image.
Figure 9:
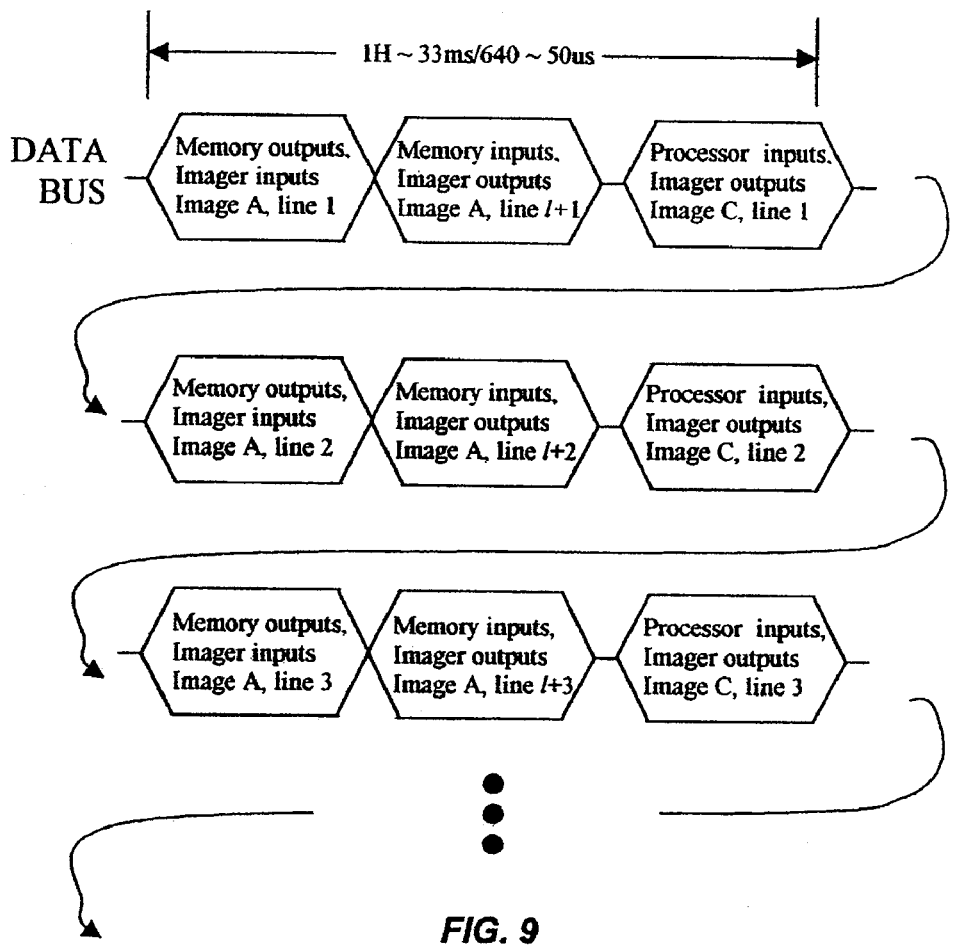
FIG. 9 is another illustration showing the method for storing and combining pixel data for a video image.

To capture a video picture, the lines of pixel data of the first image of the picture may be stored in the external memory 74. When the first line of the second image of the picture is available, the first line of the first image is retrieved from memory 74 at the memory data rate and combined in the data combiner 50 as shown in FIGS. 8 and 9. The combined data is transferred to the external processor 72 at the processor data rate. As shown in FIG. 9, the external memory is both outputting and inputting lines of pixel data from the first image at the memory data rate.

For video capture the buffers 28, 30, 32 and 34 may perform a resolution conversion of the incoming pixel data. There are two common video standards NTSC and PAL. NTSC requires 480 horizontal lines. PAL requires 590 horizontal lines. To provide high still image resolution the pixel array 12 may contain up to 1500 horizontal lines. The image sensor converts the output data into a standard format. Converting on board the image sensor reduces the overhead on the processor 72.

Figure 10:
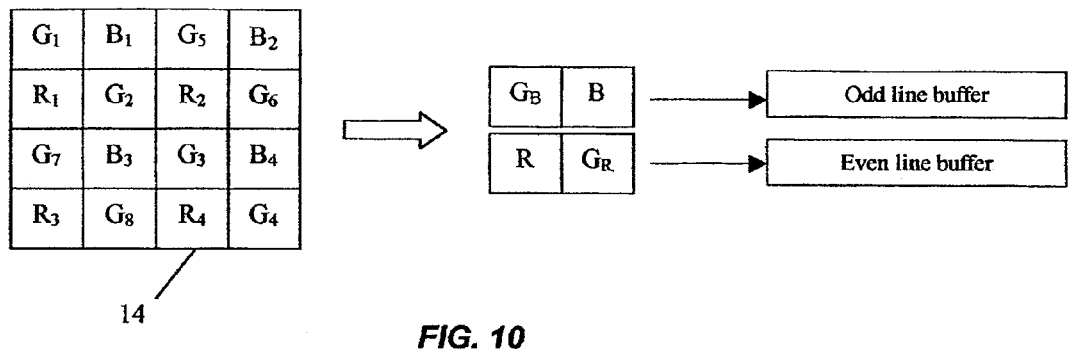
FIG. 10 is an illustration showing a method for converting the resolution of pixel data.

FIG. 10 shows a technique for converting the resolution and reducing the amount of data. Reducing data lowers the noise and power consumption of the image sensor. Additionally, lower data reduces the memory requirements of the external memory. The first method reduces 4 contiguous columns and four contiguous rows of pixels to 2 columns and 2 rows of pixels. The pixel array 12 includes a 4 by 4 pixel group containing red (R), green (G) and blue (B) pixels arranged in a Bayer pattern. The 4 by 4 array is reduced to a 2 by 2 array in accordance with the following equations:

$$R = \tfrac{1}{4} * (R_1 + R_2 + R_3 + R_4) \quad (1)$$

$$B = \tfrac{1}{4} * (B_1 + B_2 + B_3 + B_4) \quad (2)$$

$$G_B = \tfrac{1}{2} * (G_1 + G_2) \quad (3)$$

$$G_R = \tfrac{1}{2} * (G_3 + G_4) \quad (4)$$

The net effect is a 75% reduction in the data rate, arranged in a Bayer pattern.

Figure 11:
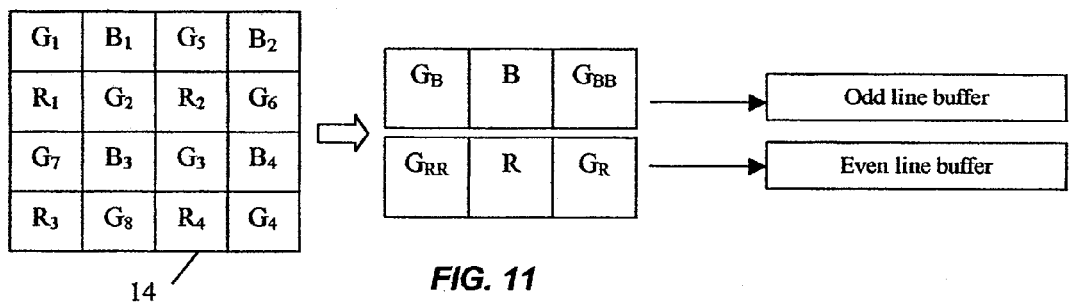
FIG. 11 is an illustration showing an alternate method for converting the resolution of the pixel data.

FIG. 11 shows an alternative method for resolution conversion. The second technique provides a 4:2:0 encoding that is compatible with MPEG-2. The conversion is performed using the following equations:

$$R = \tfrac{1}{4} * (R_1 + R_2 + R_3 + R_4) \quad (5)$$

$$B = \tfrac{1}{4} * (B_1 + B_2 + B_3 + B_4) \quad (6)$$

$$G_B = \tfrac{1}{2} * (G_1 + G_2) \quad (7)$$

$$G_R = \tfrac{1}{2} * (G_3 + G_4) \quad (8)$$

$$G_{BB} = \tfrac{1}{2} * (G_5 + G_6) \quad (9)$$

$$G_{RR} = \tfrac{1}{2} * (G_7 + G_8) \quad (10)$$

The net effect is a 62.5% reduction in the data rate.

Figure 12:
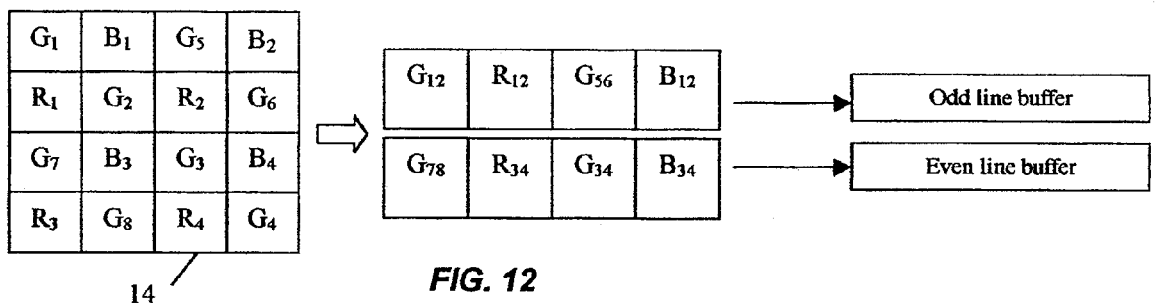
FIG. 12 is an illustration showing an alternate method for converting the resolution of the pixel data.

FIG. 12 shows yet another alternative resolution conversion method. The third method provides a 4:2:2 encoding technique using the following equations:

$$G_{12} = \tfrac{1}{2} * (G_1 + G_2) \quad (11)$$

$$G_{34} = \tfrac{1}{2} * (G_3 + G_4) \quad (12)$$

$$G_{56} = \tfrac{1}{2} * (G_5 + G_6) \quad (13)$$

$$G_{78} = \tfrac{1}{2} * (G_7 + G_8) \quad (14)$$

$$R_{12} = \tfrac{1}{2} * (R_1 + R_2) \quad (15)$$

$$R_{34} = \tfrac{1}{2} * (R_3 + R_4) \quad (16)$$

$$B_{12} = \tfrac{1}{2} * (B_1 + B_2) \quad (17)$$

$$B_{34} = \tfrac{1}{2} * (B_3 + B_4) \quad (18)$$

The net effect is a 50% reduction in the data rate.

To conserve energy the memory controller 44 may power down the external memory 74 when memory is not receiving or transmitting data. To achieve this function the controller 44 may have a power control pin 76 connected to the CKE pin of a SDRAM (see FIG. 1).

Figure 13:
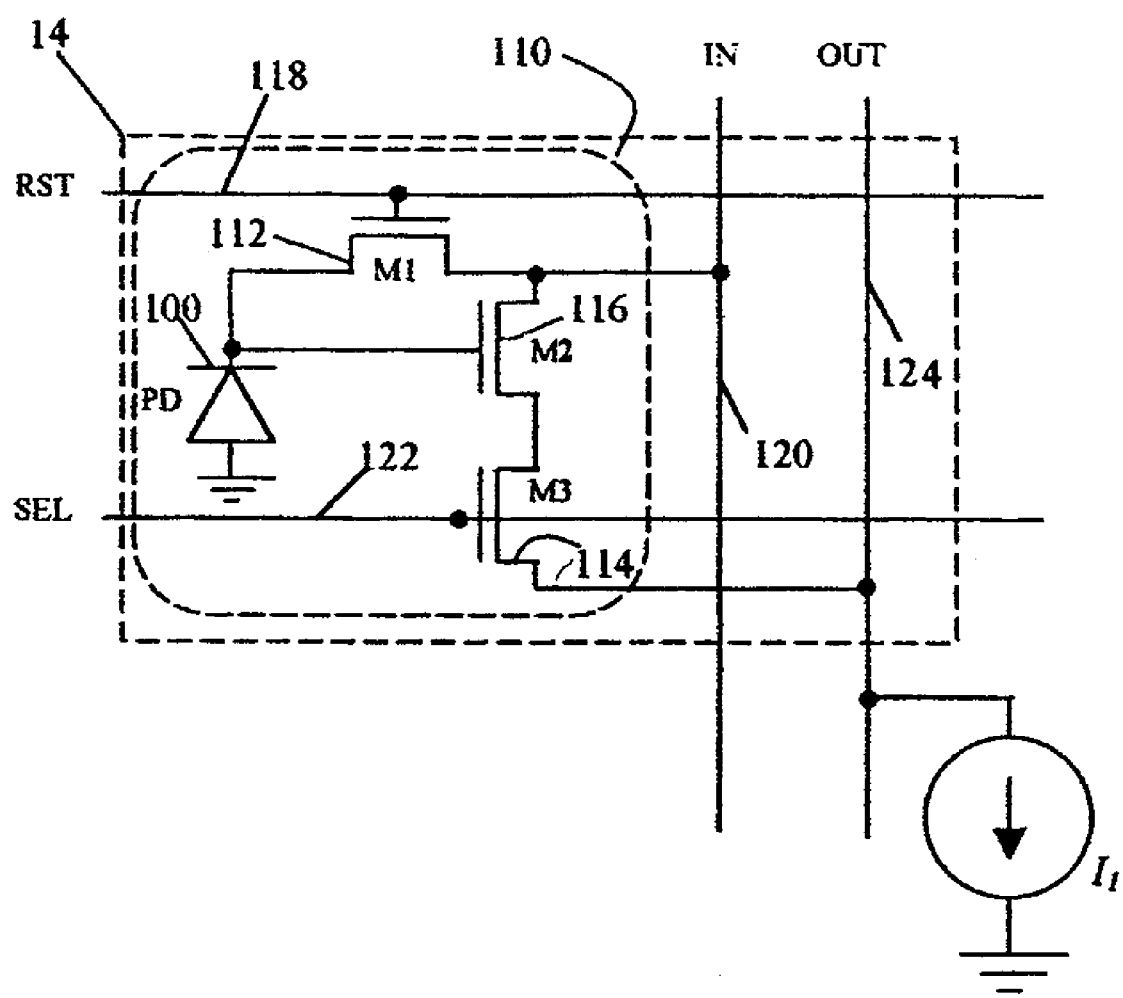
FIG. 13 is a schematic of an embodiment of a pixel of the image sensor.

FIG. 13 shows an embodiment of a cell structure for a pixel 14 of the pixel array 12. The pixel 14 may contain a photodetector 100. By way of example, the photodetector 100 may be a photodiode. The photodetector 100 may be connected to a reset transistor 112. The photodetector 100 may also be coupled to a select transistor 114 through a level shifting transistor 116. The transistors 112, 114 and 116 may be field effect transistors (FETs).

The gate of reset transistor 112 may be connected to a RST line 118. The drain node of the transistor 112 may be connected to IN line 120. The gate of select transistor 114 may be connected to a SEL line 122. The source node of transistor 114 may be connected to an OUT line 124. The RST 118 and SEL lines 122 may be common for an entire row of pixels in the pixel array 12. Likewise, the IN 120 and OUT 124 lines may be common for an entire column of pixels in the pixel array 12. The RST line 118 and SEL line 122 are connected to the row decoder 20 and are part of the control lines 22.

Figure 14:
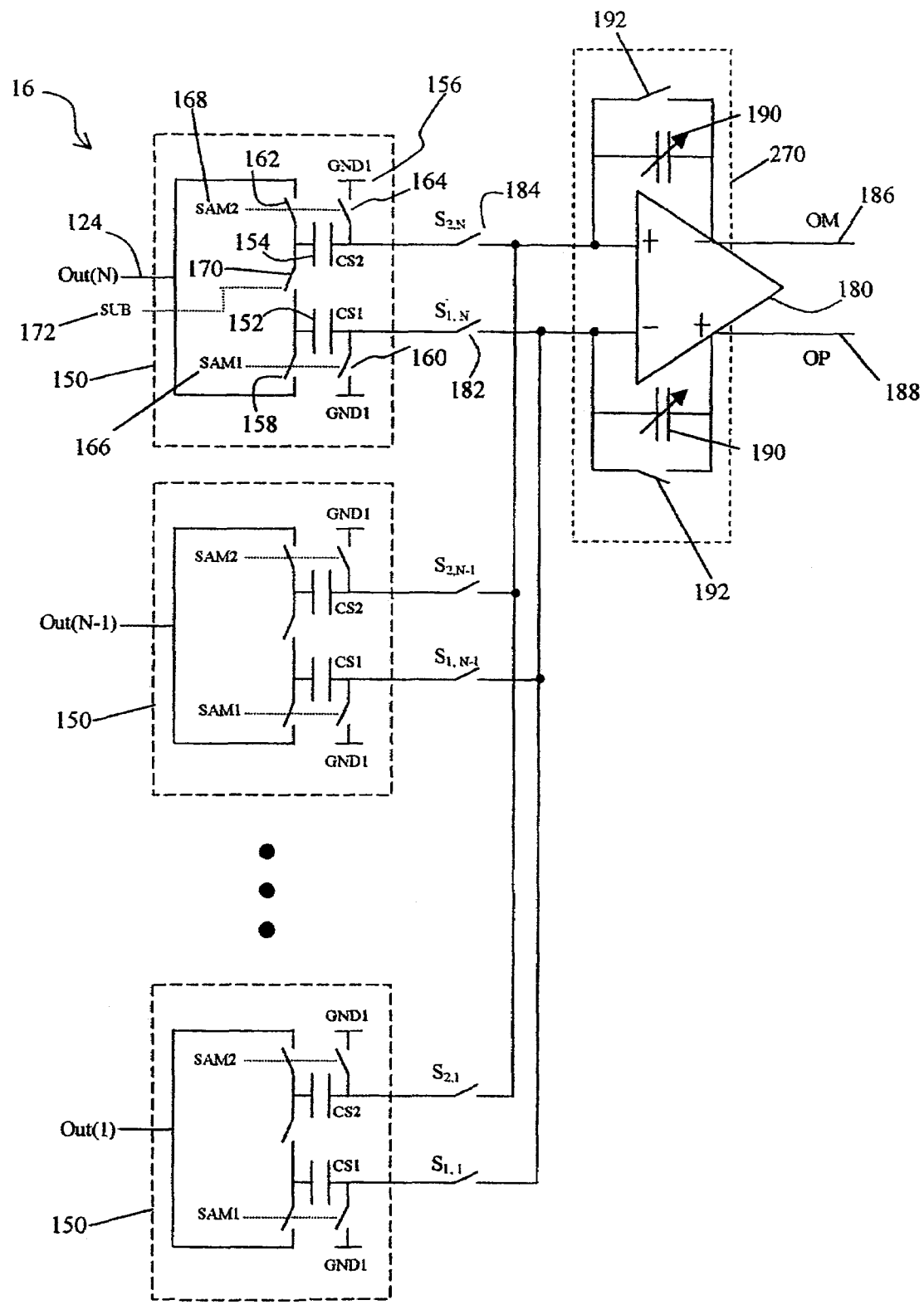
FIG. 14 is a schematic of an embodiment of a light reader circuit of the image sensor.

FIG. 14 shows an embodiment of a light reader circuit 16. The light reader 16 may include a plurality of double sampling capacitor circuits 150 each connected to an OUT line 124 of the pixel array 12. Each double sampling circuit 150 may include a first capacitor 152 and a second capacitor 154. The first capacitor 152 is coupled to the OUT line 124 and ground GND1 156 by switches 158 and 160, respectively. The second capacitor 154 is coupled to the OUT line 124 and ground GND1 by switches 162 and 164, respectively. Switches 158 and 160 are controlled by a control line SAM1 166. Switches 162 and 164 are controlled by a control line SAM2 168. The capacitors 152 and 154 can be connected together to perform a voltage subtraction by closing switch 170. The switch 170 is controlled by a control line SUB 172.

The double sampling circuits 150 are connected to an operational amplifier 180 by a plurality of first switches 182 and a plurality of second switches 184. The amplifier 180 has a negative terminal − coupled to the first capacitors 152 by the first switches 182 and a positive terminal + coupled to the second capacitors 154 by the second switches 184. The operational amplifier 180 has a positive output + connected to an output line OP 188 and a negative output − connected to an output line OM 186. The output lines 186 and 188 are connected to the ADC 24 (see FIG. 1).

The operational amplifier 180 provides an amplified signal that is the difference between the voltage stored in the first capacitor 152 and the voltage stored in the second capacitor 154 of a sampling circuit 150 connected to the amplifier 180. The gain of the amplifier 180 can be varied by adjusting the variable capacitors 190. The variable capacitors 190 may be discharged by closing a pair of switches 192. The switches 192 may be connected to a corresponding control line (not shown). Although a single amplifier is shown and described, it is to be understood that more than one amplifier can be used in the light reader circuit 16.

Figure 15:
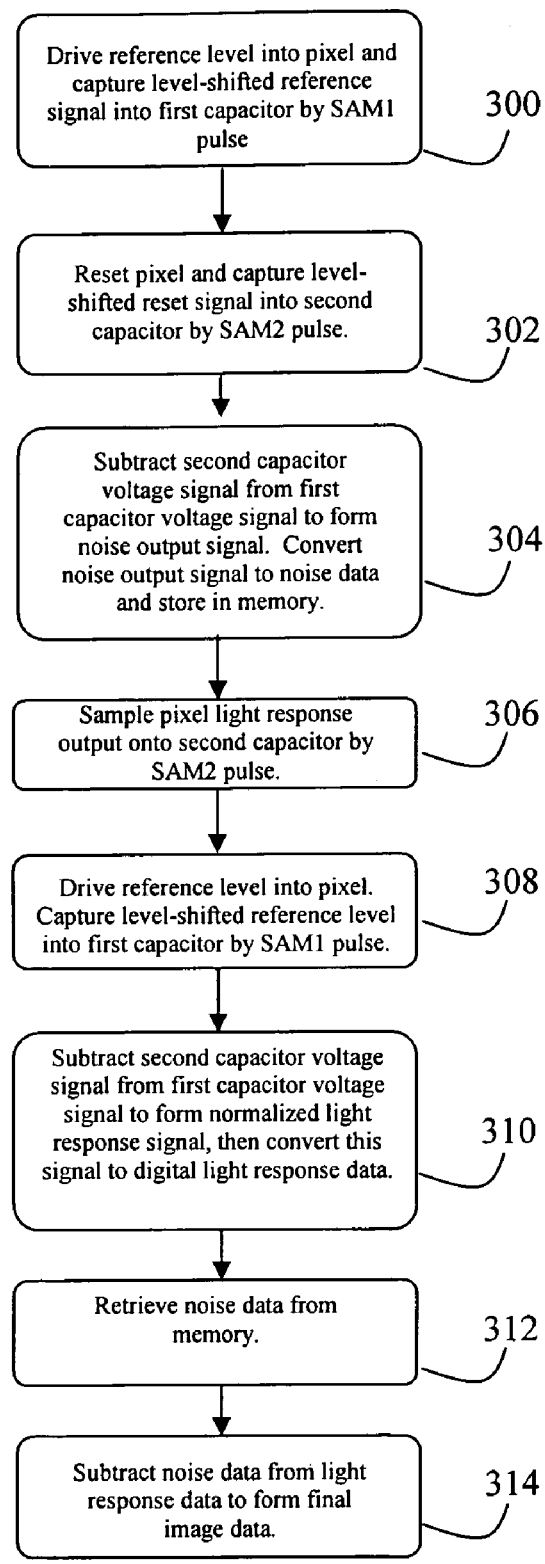
FIG. 15 is a flowchart for a first mode of operation of the image sensor.
Figure 16:
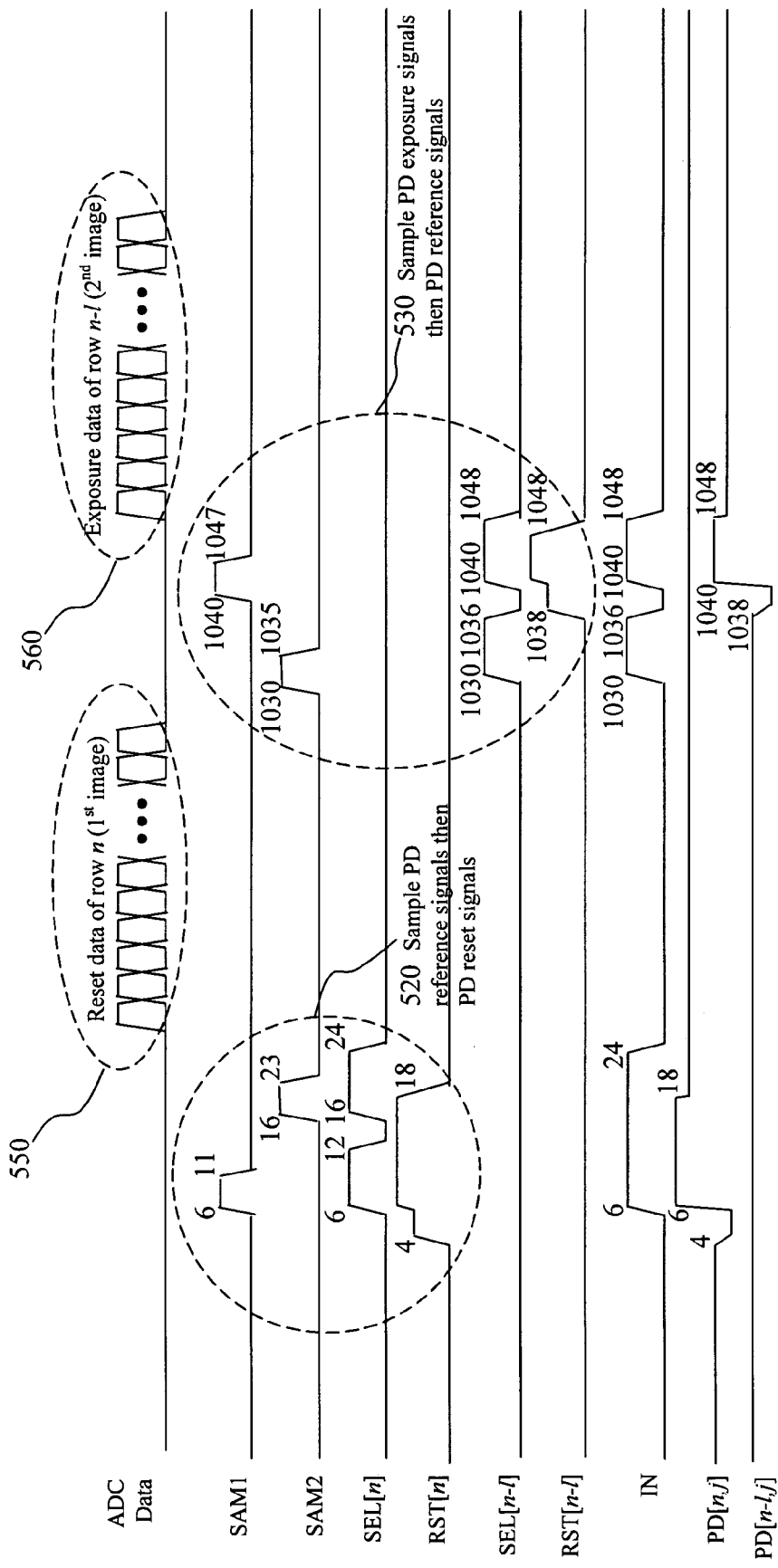
FIG. 16 is a timing diagram for the first mode of operation of the image sensor.

FIGS. 15 and 16 show an operation of the image sensor 10 in a first mode also referred to as a low noise mode. In process block 300 a reference signal is written into each pixel 14 of the pixel array and then a first reference output signal is stored in the light reader 16. Referring to FIGS. 13 and 16, this can be accomplished by switching the RST 118 and IN 120 lines from a low voltage to a high voltage to turn on transistor 112. The RST line 118 is driven high for an entire row. IN line 120 is driven high for an entire column. In the preferred embodiment, RST line 118 is first driven high while the IN line 120 is initially low.

The RST line 118 may be connected to a tri-state buffer (not shown) that is switched to a tri-state when the IN line 120 is switched to a high state. This allows the gate voltage to float to a value that is higher than the voltage on the IN line 120. This causes the transistor 112 to enter the triode region. In the triode region the voltage across the photodiode 100 is approximately the same as the voltage on the IN line 120. Generating a higher gate voltage allows the photodetector to be reset at a level close to Vdd. CMOS sensors of the prior art reset the photodetector to a level of Vdd−Vgs, where Vgs can be up to 1 V.

The SEL line 122 is also switched to a high voltage level which turns on transistor 114. The voltage of the photodiode 100 is provided to the OUT line 124 through level shifter transistor 116 and select transistor 114. The SAM1 control line 166 of the light reader 16 (see FIG. 14) is selected so that the voltage on the OUT line 124 is stored in the first capacitor 152.

Figure 17:
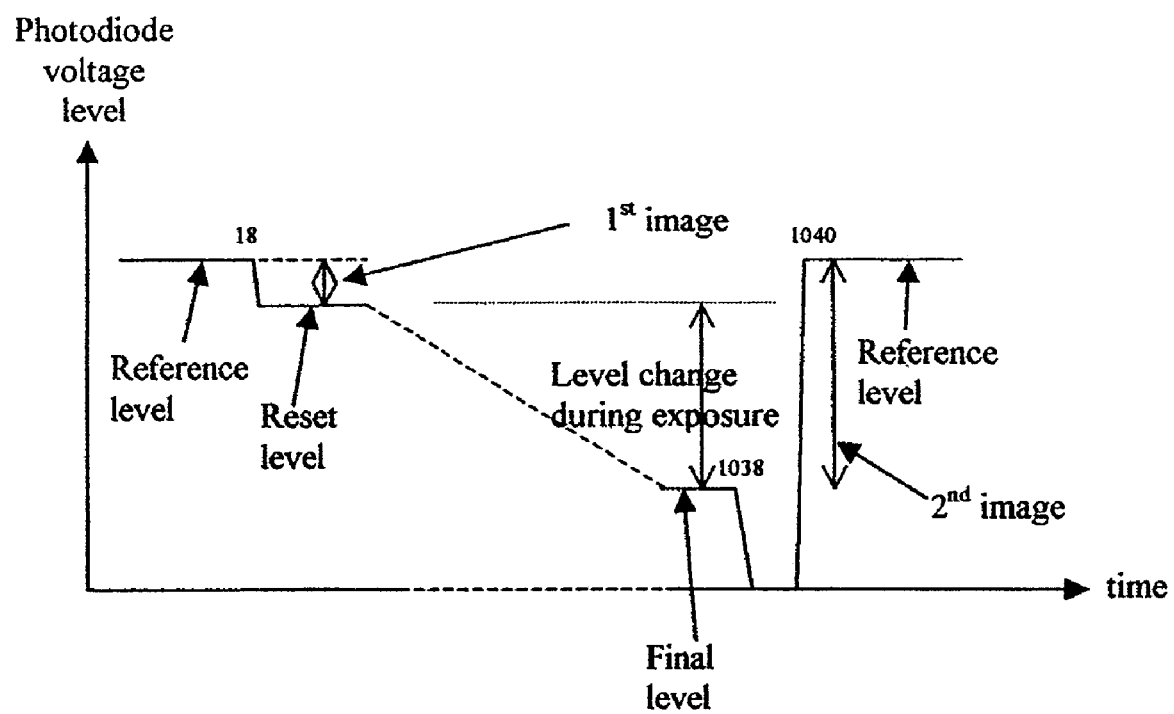
FIG. 17 is a diagram showing the levels of a signal across a photodiode of a pixel.

Referring to FIG. 15, in process block 302 the pixels of the pixel array are then reset and reset output signals are then stored in the light reader 16. Referring to FIGS. 13 and 16 this can be accomplished by driving the RST line 118 low to turn off the transistor 112 and reset the pixel 14. Turning off the transistor 112 will create reset noise, charge injection and clock feedthrough voltage that resides across the photodiode 100. As shown in FIG. 17 the noise reduces the voltage at the photodetector 100 when the transistor 112 is reset.

The SAM2 line 168 is driven high, the SEL line 122 is driven low and then high again, so that a level shifted voltage of the photodiode 100 is stored as a reset output signal in the second capacitor 154 of the light reader circuit 16. Process blocks 300 and 302 are repeated for each pixel 14 in the array 12.

Referring to FIG. 15, in process block 304 the reset output signals are then subtracted from the first reference output signals to create noise output signals that are then converted to digital bit strings by ADC 24. The digital output data is stored within the external memory 74 in accordance with one of the techniques described in FIG. 2, 3, 8 or 9. The noise signals correspond to the first image pixel data. Referring to FIG. 14, the subtraction process can be accomplished by closing switches 182, 184 and 170 of the light reader circuit 16 (FIG. 14) to subtract the voltage across the second capacitor 154 from the voltage across the first capacitor 152.

Referring to FIG. 15, in block 306 light response output signals are sampled from the pixels 14 of the pixel array 12 and stored in the light reader circuit 16. The light response output signals correspond to the optical image that is being detected by the image sensor 10. Referring to FIGS. 13, 14 and 16 this can be accomplished by having the IN 120, SEL 122 and SAM2 lines 168 in a high state and RST 118 in a low state. The second capacitor 152 of the light reader circuit 16 stores a level shifted voltage of the photodiode 100 as the light response output signal.

Referring to FIG. 15, in block 308 a second reference output signal is then generated in the pixels 14 and stored in the light reader circuit 16. Referring to FIGS. 13, 14 and 16, this can be accomplished similar to generating and storing the first reference output signal. The RST line 118 is first driven high and then into a tri-state. The IN line 120 is then driven high to cause the transistor 112 to enter the triode region so that the voltage across the photodiode 100 is the voltage on IN line 120. The SEL 122 and SAM2 168 lines are then driven high to store the second reference output voltage in the first capacitor 154 of the light reader circuit 16. Process blocks 306 and 308 are repeated for each pixel 14 in the array 12.

Referring to FIG. 15, in block 310 the light response output signal is subtracted from the second reference output signal to create a normalized light response output signal. The normalized light response output signal is converted into a digital bit string to create normalized light output data that is stored in the second image buffers 32 and 34. The normalized light response output signals correspond to the second image pixel data. Referring to FIGS. 13, 14 and 16 the subtraction process can be accomplished by closing switches 170, 182 and 184 of the light reader 16 to subtract the voltage across the first capacitor 152 from the voltage across the second capacitor 154. The difference is then amplified by amplifier 180 and converted into a digital bit string by ADC 24 as light response data.

Referring to FIG. 15, in block 312 the noise data is retrieved from external memory. In block 314 the noise data is combined (subtracted) with the normalized light output data in accordance with one of the techniques shown in FIG. 3, 4, 5, 6, 7 or 8. The noise data corresponds to the first image and the normalized light output data corresponds to the second image. The second reference output signal is the same or approximately the same as the first reference output signal such that the present technique subtracts the noise data, due to reset noise, charge injection and clock feedthrough, from the normalized light response signal. This improves the signal to noise ratio of the final image data. The image sensor performs this noise cancellation with a pixel that has only three transistor. This image sensor thus provides noise cancellation while maintaining a relatively small pixel pitch. This process is accomplished using an external processor 72 and external memory 74.

The process described is performed in a sequence across the various rows of the pixels in the pixel array 12. As shown in FIG. 16, the n-th row in the pixel array may be generating noise signals while the n−1-th row generates normalized light response signals, where l is the exposure duration in multiples of a line period.

Referring to FIG. 17, if a pixel(s) receives high intensity illumination, such as direct sunlight or a mirror reflection, the reset voltage may drop a significant amount and create skewed data. For example, the camera could generate a dark spot as opposed to bright illumination.

To prevent such a scenario, the reset level may be compared to a threshold. By way of example, the combiner 50 shown in FIG. 1, may compare the reset level to a reserved threshold value. The threshold value may be chosen to be 100 mV more than the reset level when the image sensor is not exposed to bright illumination. If the reset level exceeds the threshold then the combiner 50 may output the maximum illumination value. For example, for a system that provides a 10 bit value, the combiner 50 may output 11 1111 1111 ("MAX signal"). The combiner 50 may also set a CLAMP value that corresponds to the upper limit minus one (e.g. 11 1111 1110). The CLAMP value corresponds to the maximum value detected through normal processing.

The combiner 50 may output a special reserved code, for example 11 0000 0000 ("MAX signal"), to represent this maximum illumination value. For normal processing, i.e. the reset level does not cross the threshold, the combiner 50 outputs all possible codes except this special reserved code. For example, if the normal processing would produce a value equal to this special reserved code, the combiner 50 may skip to the next higher value code, in this example 11 0000 0001.

In this manner, the processor 72 can unambiguously detect that a pixel value designates a reset level crossing threshold due to excessive illumination on the pixel when the pixel value is equal to the MAX signal. The processor 72 may proceed to image processing on the picture received from the image sensor 10 to eliminate the picture artifact of a darkened ring as follows.

Figure 17A:
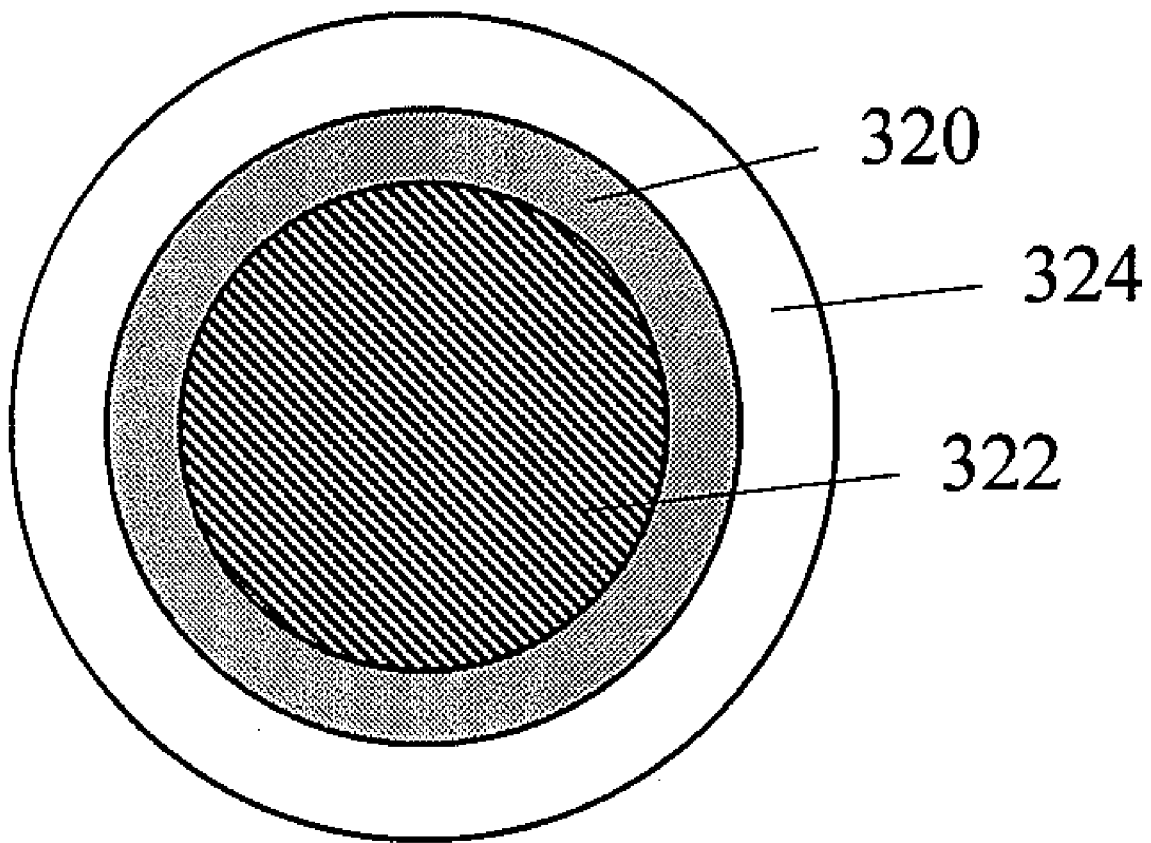
FIG. 17A is an illustration showing a darken ring region around a bright spot.

As shown in FIG. 17A the image may include a darken ring 320 around a bright spot 322 and bounded by an outer region 324. The processor 72 can perform an analysis on the pixels to determine whether the pixels adjacent to a pixel with a MAX signal should have a MAX or CLAMP value. For example, if a first pixel has a MAX value, and a second pixel has a CLAMP value and a third pixel is less than CLAMP, where the third pixel is physically between the first and second pixels, and there are not intervening pixels between the first and third pixels that have either a MAX or CLAMP value, then the third pixel is attributed to the darkened region 320 and given either a Maximal or CLAMP value. A row of pixels can be analyzed to determine a variation in values and assign the third pixel accordingly. An alternate embodiment may have the combiner 50 perform this procedure to assign the third pixel accordingly. This process can be performed in accordance with the following steps.
1) Initialize flag RIGHT_OF_MAX to 0.
2) Initialize flag RIGHT_OF_CLAMP to 0.
3) Scan pixels from left to right. while scanning, do the following:
   a) If transit from a MAX-pixel to a non-MAX pixel, set RIGHT_OF_MAX to 1.
   b) If transit from a non-MAX pixel to a MAX-pixel, clear RIGHT_OF_MAX to 0.
   c) If transit from a CLAMP-pixel to a non-CLAMP pixel, set RIGHT_OF_CLAMP to 1.
   d) If transit from a non-CLAMP pixel to a CLAMP-pixel, clear RIGHT_OF_CLAMP to 0.
   e) At each pixel, set its PIXEL_RIGHT_OF_MAX flag to current value of RIGHT_OF_MAX, and its PIXEL_RIGHT_OF_CLAMP to current value of RIGHT_OF_CLAMP.
4) Initialize flag LEFT_OF_MAX to 0.
5) Initialize flag LEFT_OF_CLAMP to 0.
6) Then scan from right to left. While scanning, do the following:
   a) If transit from a MAX-pixel to a non-MAX pixel, set LEFT_OF_MAX to 1.
   b) If transit from a non-MAX pixel to a MAX-pixel, clear LEFT_OF_MAX to 0.
   c) If transit from a CLAMP-pixel to a non-CLAMP pixel, set LEFT_OF_CLAMP to 1.
   d) If transit from a non-CLAMP pixel to a CLAMP-pixel, clear LEFT_OF_CLAMP to 0.
   e) At each pixel, set its PIXEL_LEFT_OF_MAX flag to current value of LEFT_OF. MAX, and its PIXEL_LEFT_OF_CLAMP to current value of LEFT_OF_CLAMP.
7) Finally, scan from left to right. While scanning, do the following:
   a) If the pixel has PIXEL_RIGHT_OF_MAX=1 and PIXEL_LEFT_OF_CLAMP=1, or PIXEL_LEFT_OF_MAX=1 and PIXEL_RIGHT_OF_CLAMP=1, said pixel belongs to darkened region 320, and set a flag as such.

This sequence of steps is applicable in combiner 50 and equally well in processor 72.

Figure 18:
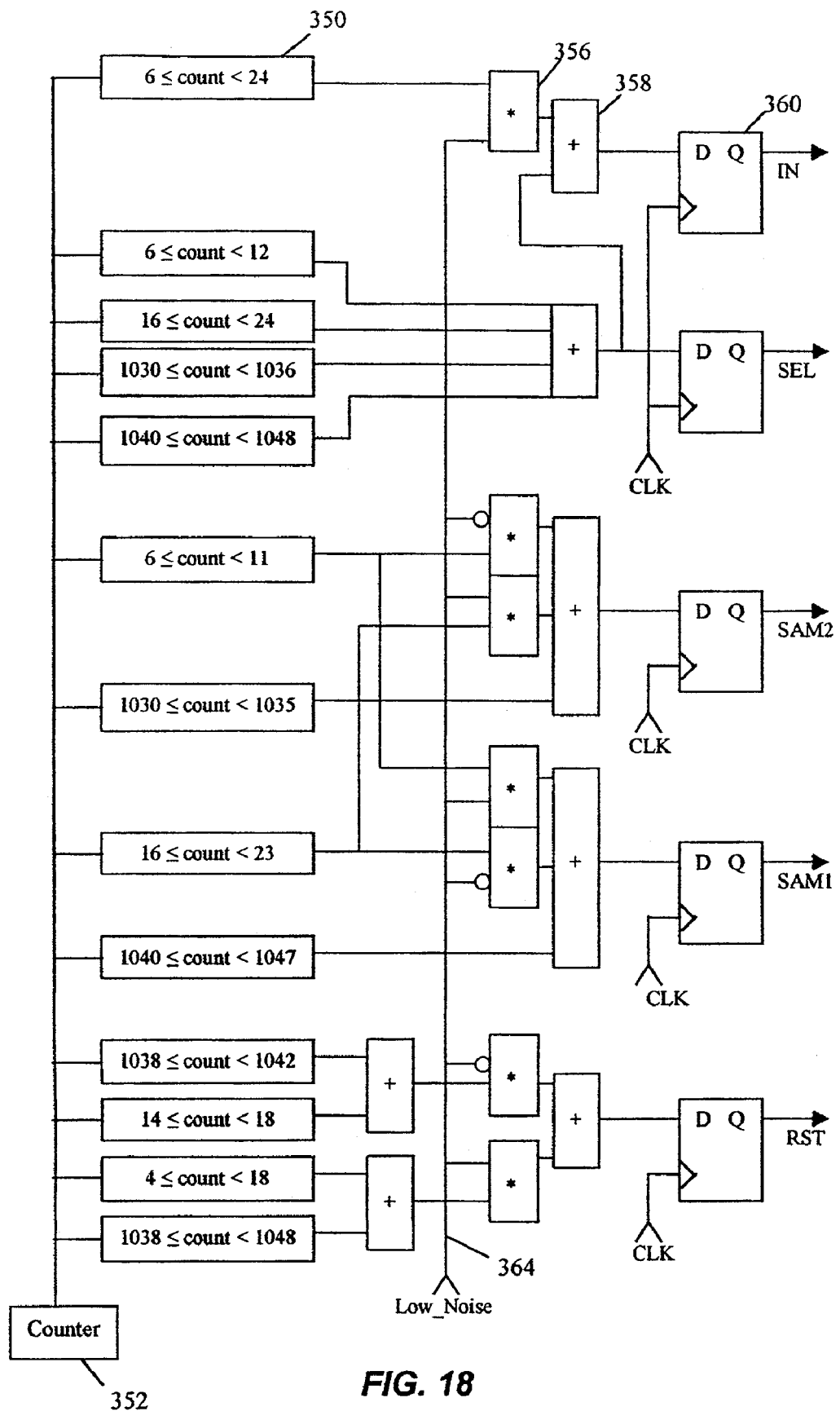
FIG. 18 is a schematic for a logic circuit for generating the timing diagrams of FIG. 16.

The various control signals RST, SEL, IN, SAM1, SAM2 and SUB can be generated in the circuit generally referred to as the row decoder 20. FIG. 18 shows an embodiment of logic to generate the IN, SEL, SAM1, SAM2 and RST signals in accordance with the timing diagram of FIG. 16. The logic may include a plurality of comparators 350 with one input connected to a counter 352 and another input connected to hardwired signals that contain a lower count value and an upper count value. The counter 352 sequentially generates a count. The comparators 350 compare the present count with the lower and upper count values. If the present count is between the lower and upper count values the comparators 350 output a logical 1.

The comparators 350 are connected to plurality of AND gates 356 and OR gates 358. The OR gates 358 are connected to latches 360. The latches 360 provide the corresponding IN, SEL, SAM1, SAM2 and RST signals. The AND gates 356 are also connected to a mode line 364. To operate in accordance with the timing diagram shown in FIG. 16, the mode line 364 is set at a logic 1.

The latches 360 switch between a logic 0 and a logic 1 in accordance with the logic established by the AND gates 356, OR gates 358, comparators 350 and the present count of the counter 352. For example, the hardwired signals for the comparator coupled to the IN latch may contain a count values of 6 and a count value of 24. If the count from the counter is greater or equal to 6 but less than 24 the comparator 350 will provide a logic 1 that will cause the IN latch 360 to output a logic 1. The lower and upper count values establish the sequence and duration of the pulses shown in FIG. 16. The mode line 364 can be switched to a logic 0 which causes the image sensor to function in a second mode.

Figure 19:
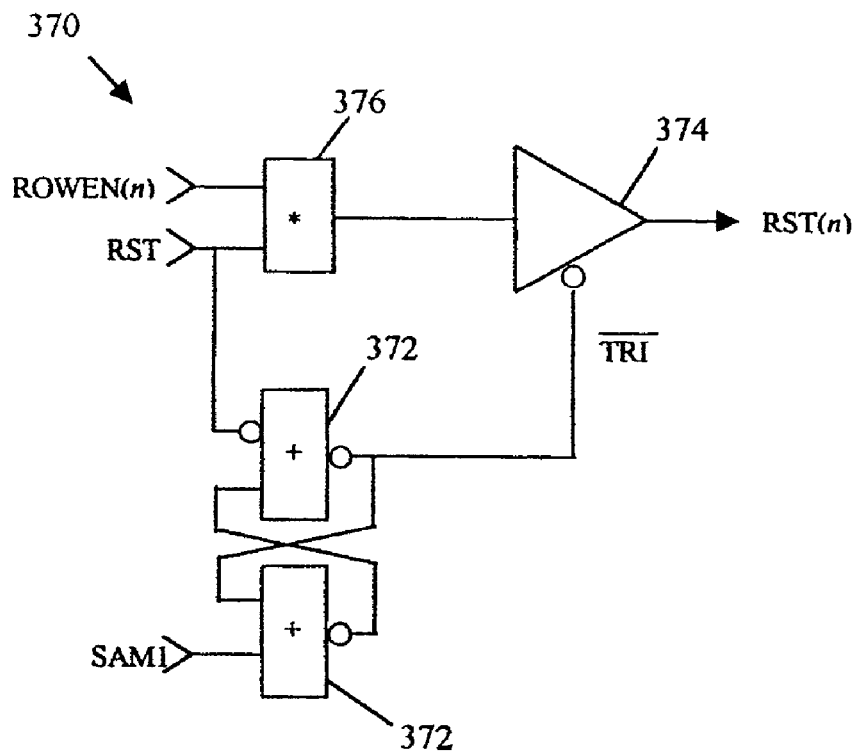
FIG. 19 is a schematic of a logic circuit for generating a RST signal for a row of pixels.
Figure 20:
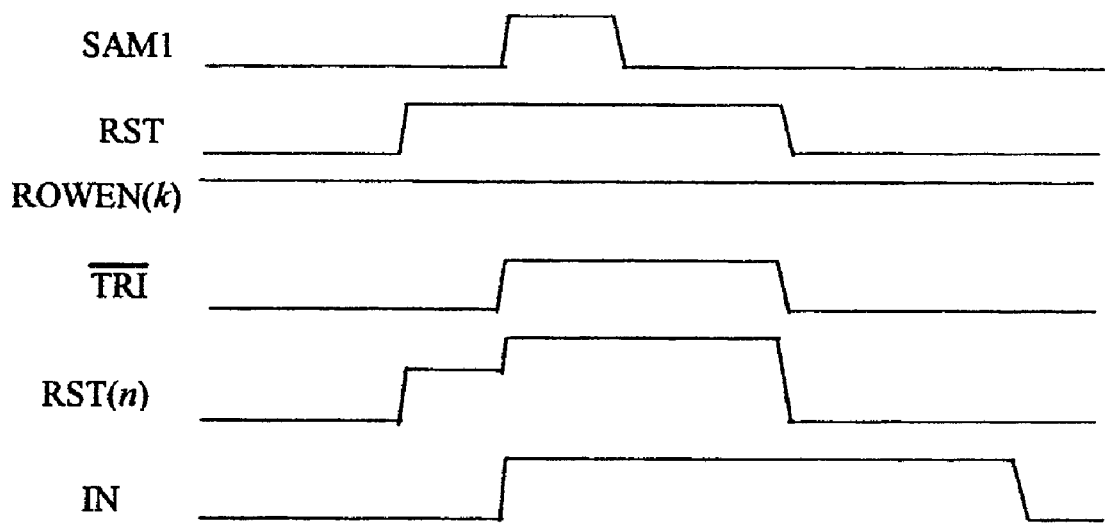
FIG. 20 is a timing diagram for the logic circuit shown in FIG. 19.

The sensor 10 may have a plurality of reset RST(n) drivers 370, each driver 370 being connected to a row of pixels. FIGS. 19 and 20 show an exemplary driver circuit 370 and the operation of the circuit 370. Each driver 370 may have a pair of NOR gates 372 that are connected to the RST and SAM1 latches shown in FIG. 18. The NOR gates control the state of a tri-state buffer 374. The tri-state buffer 374 is connected to the reset transistors in a row of pixels. The input of the tri-state buffer is connected to an AND gate 376 that is connected to the RST latch and a row enable ROWEN(n) line.

Figure 21:
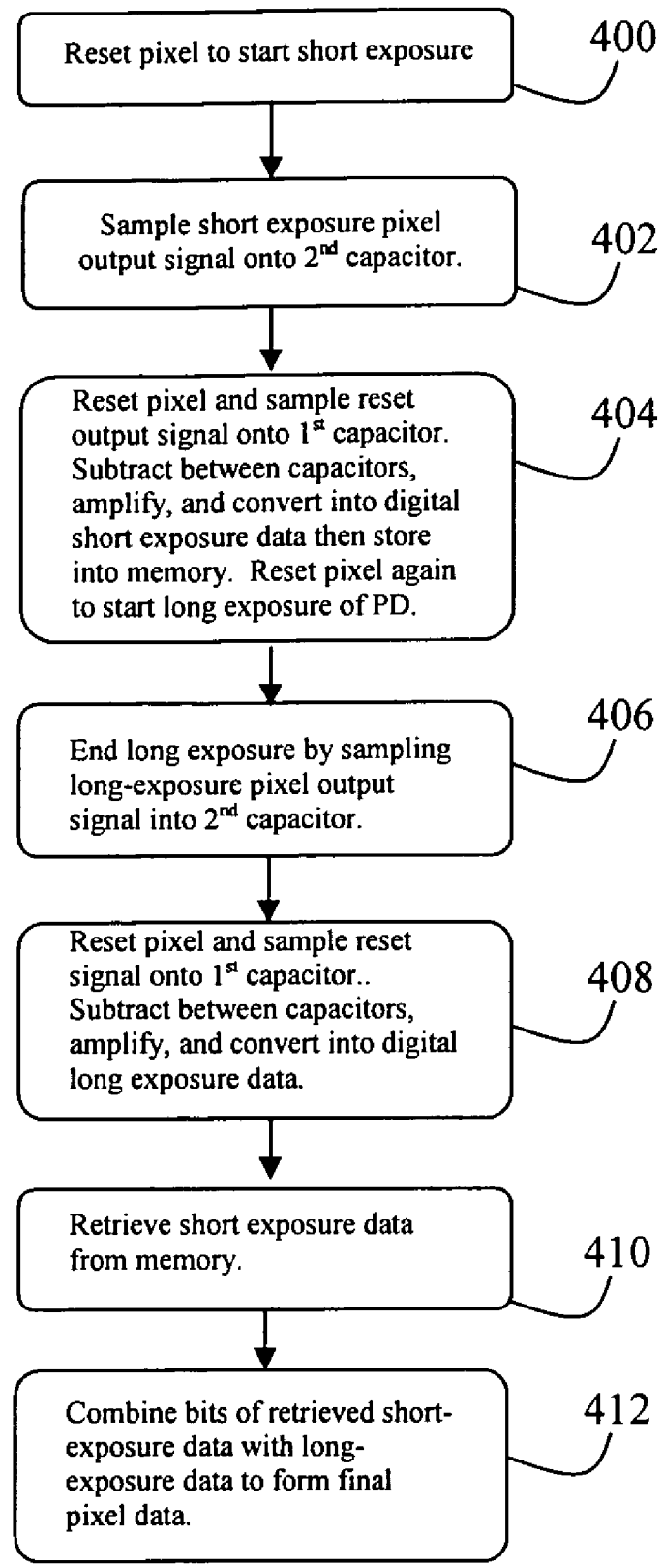
FIG. 21 is a flowchart showing a second mode of operation of the image sensor.
Figure 22:
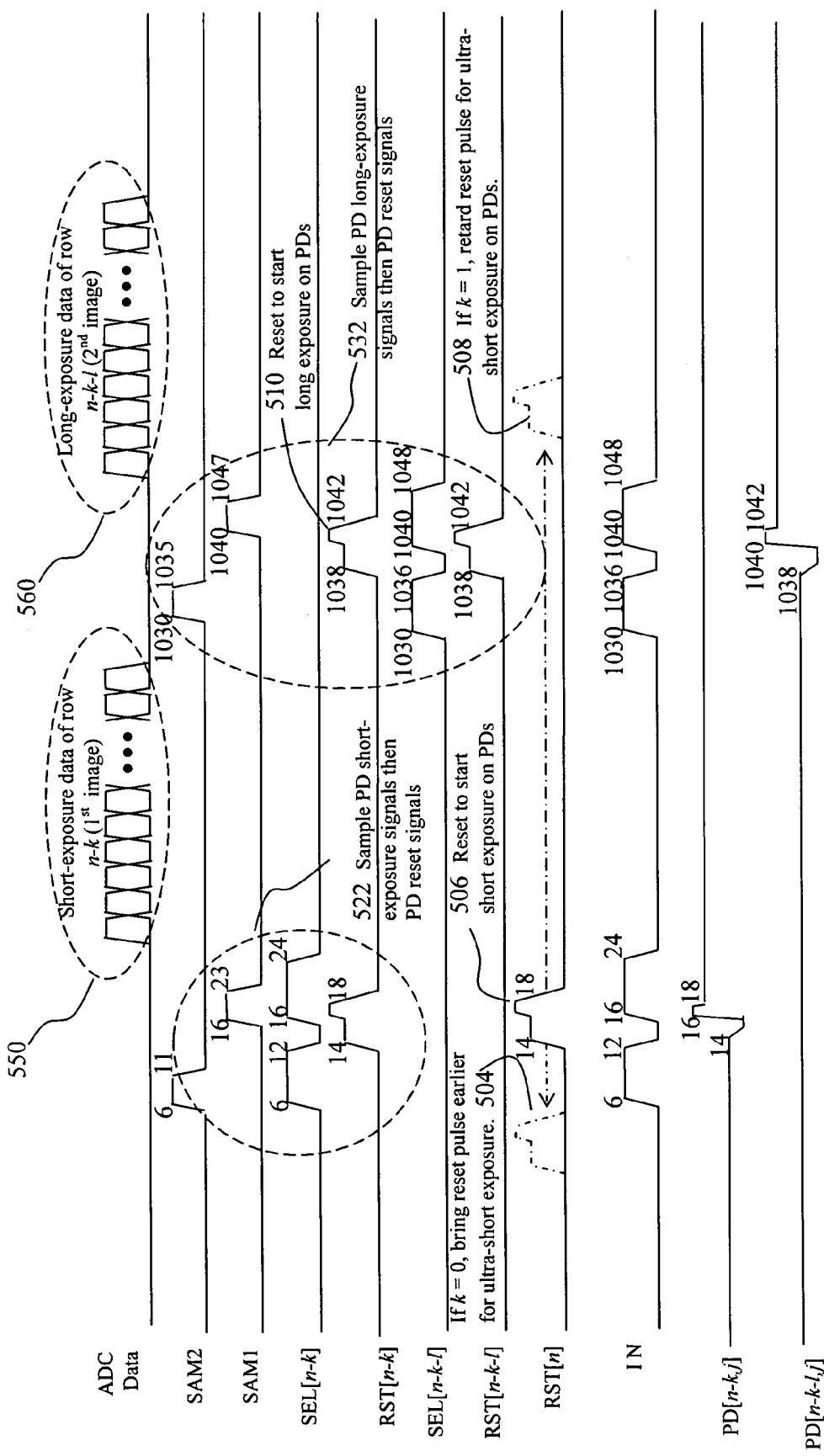
FIG. 22 is a timing diagram for the second mode of operation of the image sensor.

FIGS. 21 and 22 show operation of the image sensor in a second mode also referred to as an extended dynamic range mode. In this mode the image provides a sufficient amount of optical energy so that the SNR is adequate even without the noise cancellation technique described in FIGS. 15 and 16. Although it is to be understood that the noise cancellation technique shown in FIGS. 15 and 16 can be utilized while the image sensor 10 is in the extended dynamic range mode. The extended dynamic mode has both a short exposure period and a long exposure period. Referring to FIG. 21, in block 400 each pixel 14 is reset to start a short exposure period. The mode of the image sensor can be set by the processor 72 to determine whether the sensor should be in the low noise mode, or the extended dynamic range mode.

In block 402 a short exposure output signal is generated in the selected pixel and stored in the second capacitor 154 of the light reader circuit 16.

In block 404 the selected pixel is then reset. The level shifted reset voltage of the photodiode 100 is stored in the first capacitor 152 of the light reader circuit 16 as a reset output signal. The short exposure output signal is subtracted from the reset output signal in the light reader circuit 16. The difference between the short exposure signal and the reset signal is converted into a binary bit string by ADC 24 and stored into the external memory 74 in accordance with one of the techniques shown in FIG. 2, 3, 8 or 9. The short exposure data corresponds to the first image pixel data. Then each pixel is again reset to start a long exposure period.

In block 406 the light reader circuit 16 stores a long exposure output signal from the pixel in the second capacitor 154. In block 408 the pixel is reset and the light reader circuit 16 stores the reset output signal in the first capacitor 152. The long exposure output signal is subtracted from the reset output signal, amplified and converted into a binary bit string by ADC 24 as long exposure data.

Referring to FIG. 21, in block 410 the short exposure data is retrieved from external memory. In block 412 the short exposure data is combined with the long exposure data in accordance with one of the techniques shown in FIG. 3, 4, 5, 6, 7 or 8. The data may be combined in a number of different manners. The external processor 72 may first analyze the image with the long exposure data. The photodiodes may be saturated if the image is too bright. This would normally result in a "washed out" image. The processor 72 can process the long exposure data to determine whether the image is washed out, if so, the processor 72 can then use the short exposure image data. The processor 72 can also use both the long and short exposure data to compensate for saturated portions of the detected image.

By way of example, the image may be initially set to all zeros. The processor 72 then analyzes the long exposure data. If the long exposure data does not exceed a threshold then N least significant bits (LSB) of the image is replaced with all N bits of the long exposure data. If the long exposure data does exceed the threshold then N most significant bits (MSB) of the image are replaced by all N bits of the short exposure data. This technique increases the dynamic range by M bits, where M is the exponential in an exposure duration ratio of long and short exposures that is defined by the equation $l=2^M$. The replaced image may undergo a logarithmic mapping to a final picture of N bits in accordance with the mapping equation $Y=2^N \log_2(X)/(N+M)$.

FIG. 22 shows the timing of data generation and retrieval for the long and short exposure data. The reading of output signals from the pixel array 12 overlap with the retrieval of signals from memory 74. FIG. 22 shows timing of data generation and retrieval wherein a n-th row of pixels starts a short exposure, the (n−k)-th row ends the short exposure period and starts the long exposure period, and the (n−k−l)-th row of pixels ends the long exposure period. Where k is the short exposure duration in multiples of the line period, and l is the long exposure duration in multiples of the line period.

The memory controller 44 begins to retrieve short exposure data for the pixels in row (n−k−l) at the same time as the (n−k−l)-th pixel array is completing the long exposure period. At the beginning of a line period, the light reader circuit 16 retrieves the short exposure output signals from the (n−k)-th row of the pixel array 12 as shown by the enablement of signals SAM1, SAM2, SEL(n−k) and RST(n−k). The light reader circuit 16 then retrieves the long exposure data of the (n−k−l)-th row.

The dual modes of the image sensor 10 can compensate for varying brightness in the image. When the image brightness is low the output signals from the pixels are relatively low. This would normally reduce the SNR of the resultant data provided by the sensor, assuming the average noise is relatively constant. The noise compensation scheme shown in FIGS. 15 and 16 improve the SNR of the output data so that the image sensor provides a quality picture even when the subject image is relatively dark. Conversely, when the subject image is too bright the extended dynamic range mode depicted in FIGS. 21 and 22 compensates for such brightness to provide a quality picture.

Figure 23A:
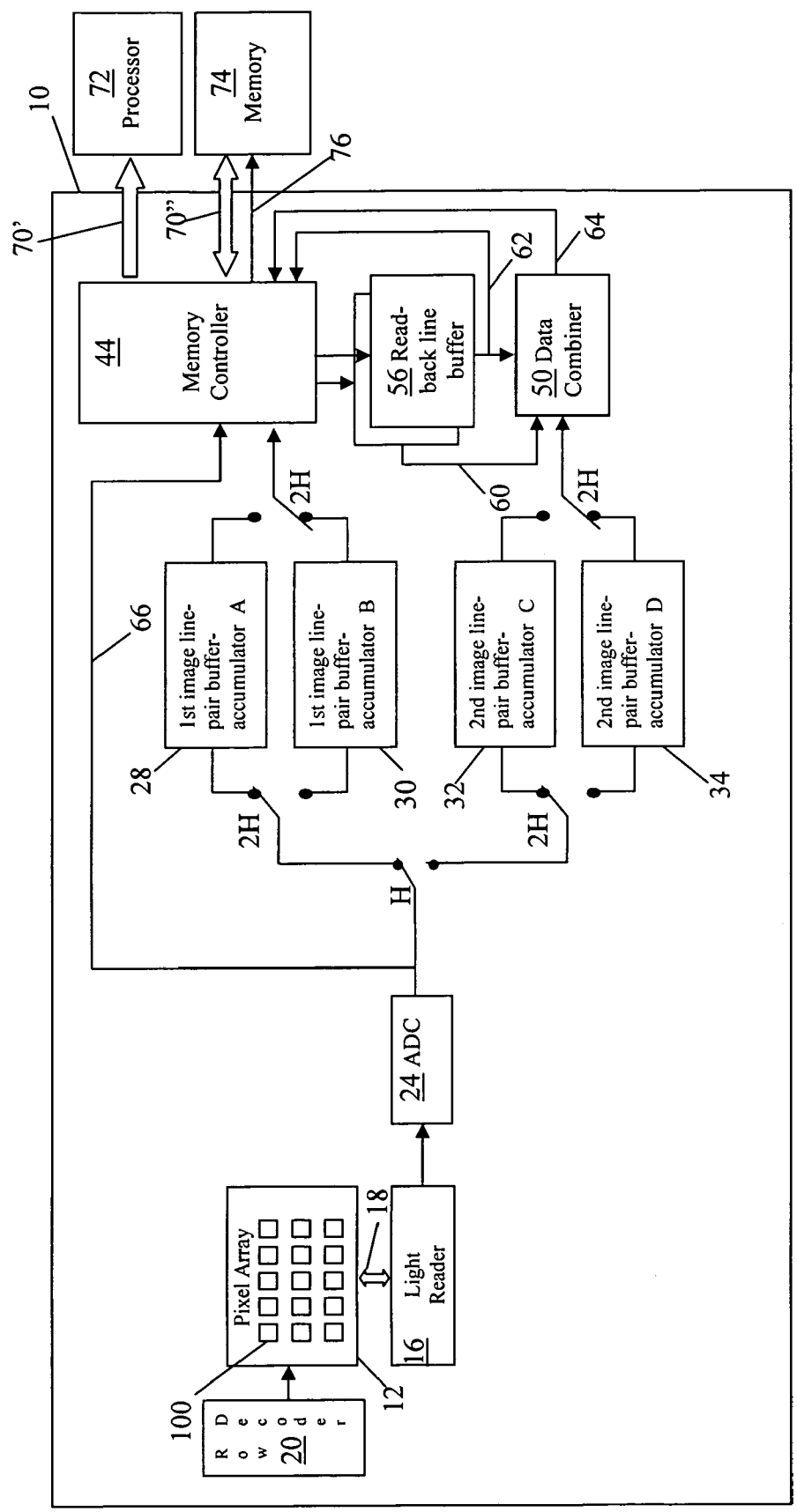
FIG. 23a is a schematic of an alternate embodiment of an image sensor system.

FIG. 23*a* shows an alternate embodiment of an image sensor that has a processor bus 70' connected to the external processor 72 and a separate memory bus 70" connected to the external memory 74. With such a configuration the processor 72 may access data while the memory 74 is storing and transferring data. This embodiment also allows for slower clock speeds on the processor bus 70' than the bus 68 of the embodiment shown in FIG. 1.

Figure 23B:
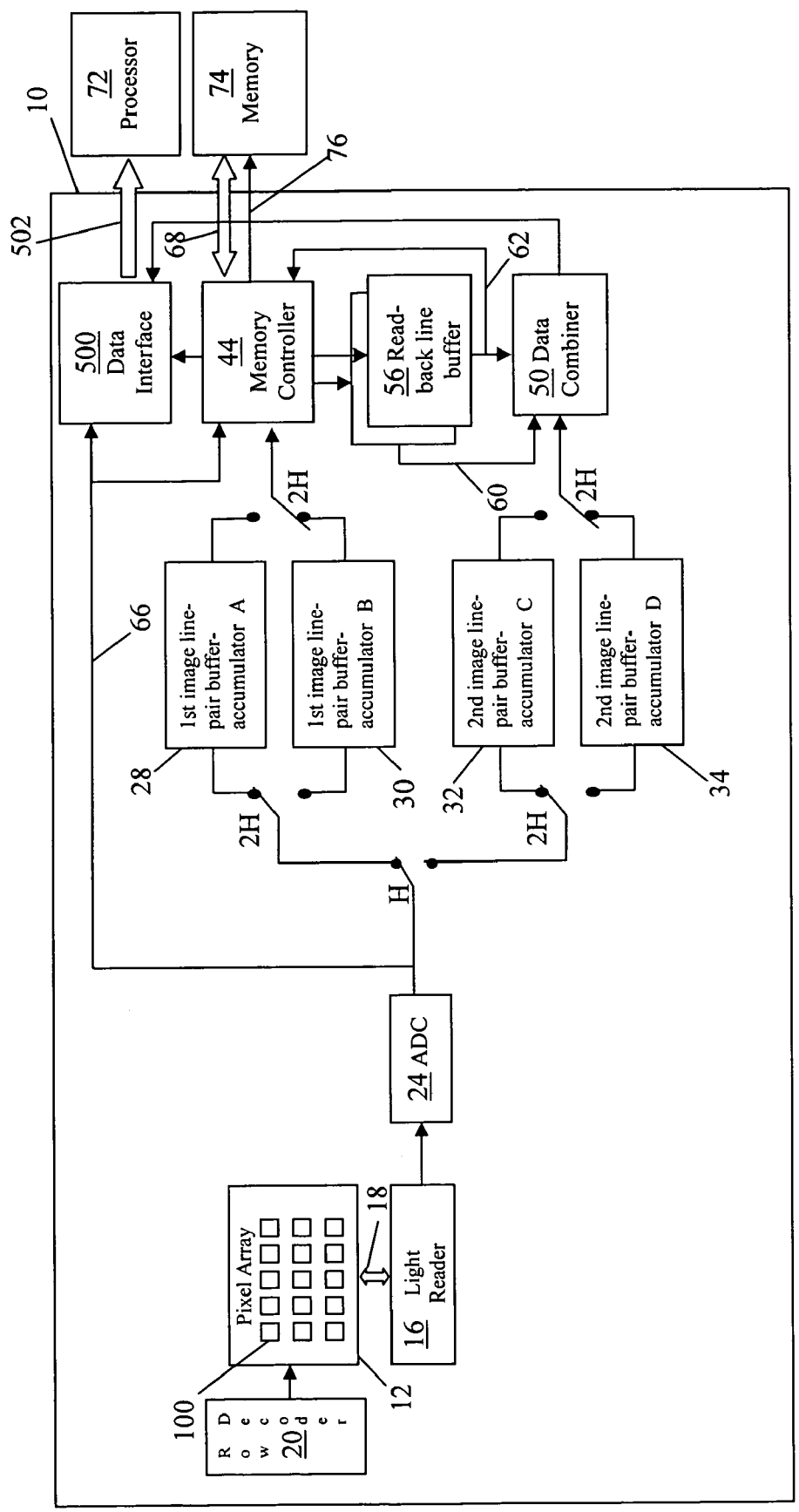
FIG. 23b is a schematic of an alternate embodiment of an image sensor system.

FIG. 23*b* shows another embodiment wherein the processor 72 is coupled to a separate data interface 500 and the external memory 74 is connected to a separate memory controller 44.

Figure 24:
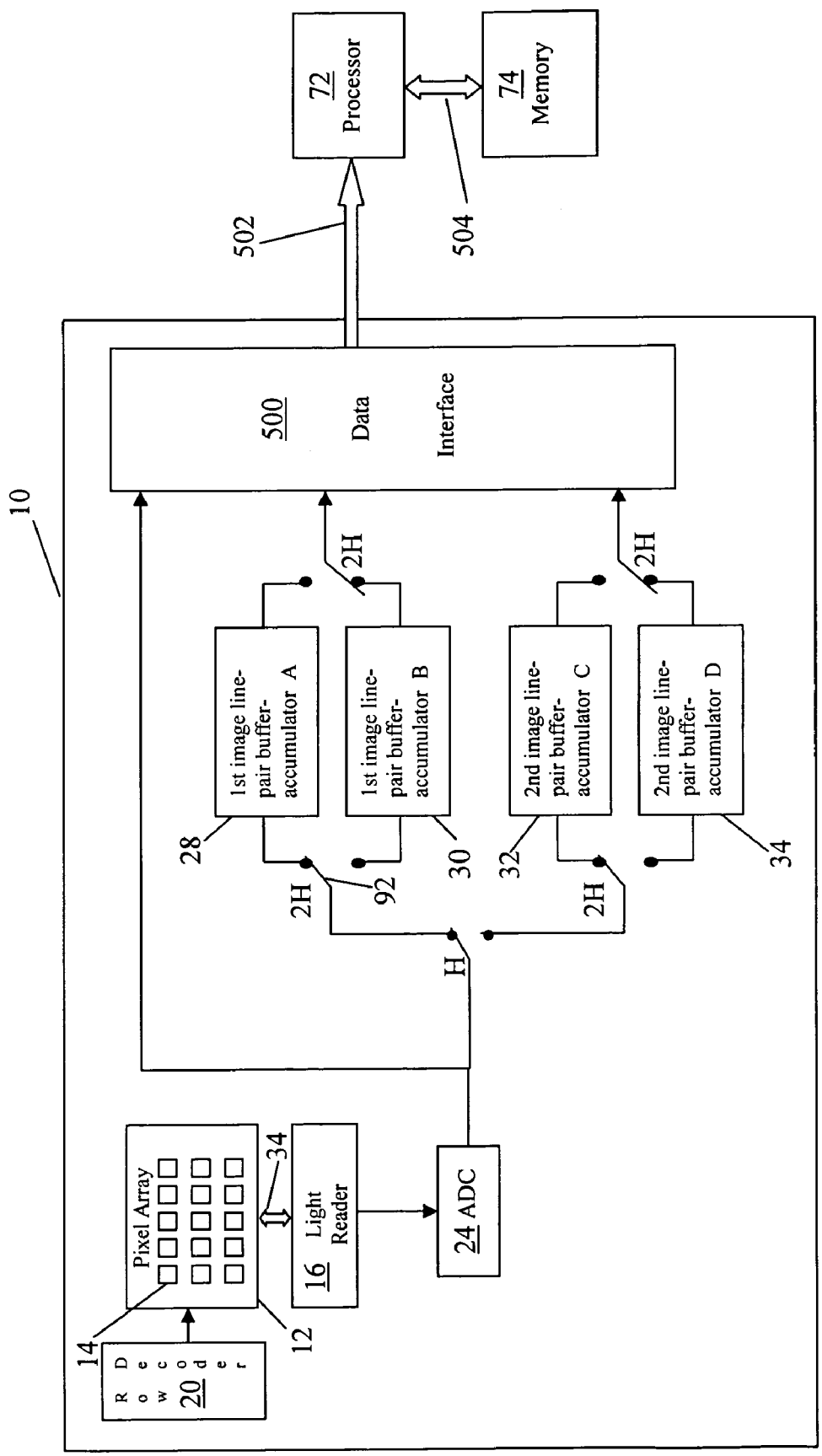
FIG. 24 is a schematic of an alternate embodiment of an image sensor system.

FIG. 24 shows another embodiment of an image sensor with a data interface 500 connected to the buffers 28, 30, 32 and 34. The interface 500 is connected to an external processor 72 by a processor bus 502. In this configuration the external memory 74 is connected to the processor 72 by a separate memory bus 504. For both still images and video capture the first and second images are provided to the external processor in an interleaving manner.

Figure 25:
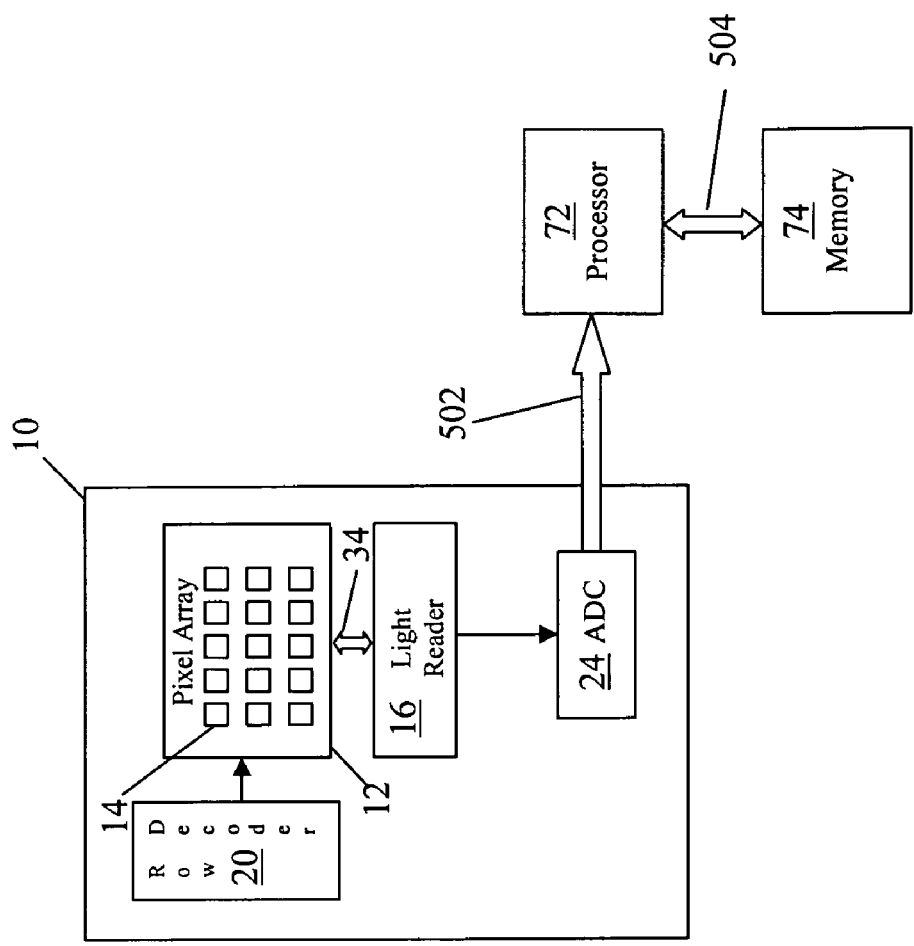
FIG. 25 is a schematic of an alternate embodiment of an image sensor system.

FIG. 25 discloses an alternate embodiment of an image sensor without the buffers 28, 30, 32 and 34. With this embodiment the ADC 24 is connected directly to the external processor 72. The processor 72 may perform computation steps such as combining (subtracting) the noise data with the normalized light output data, or the short exposure data with the long exposure data.

Figure 26:
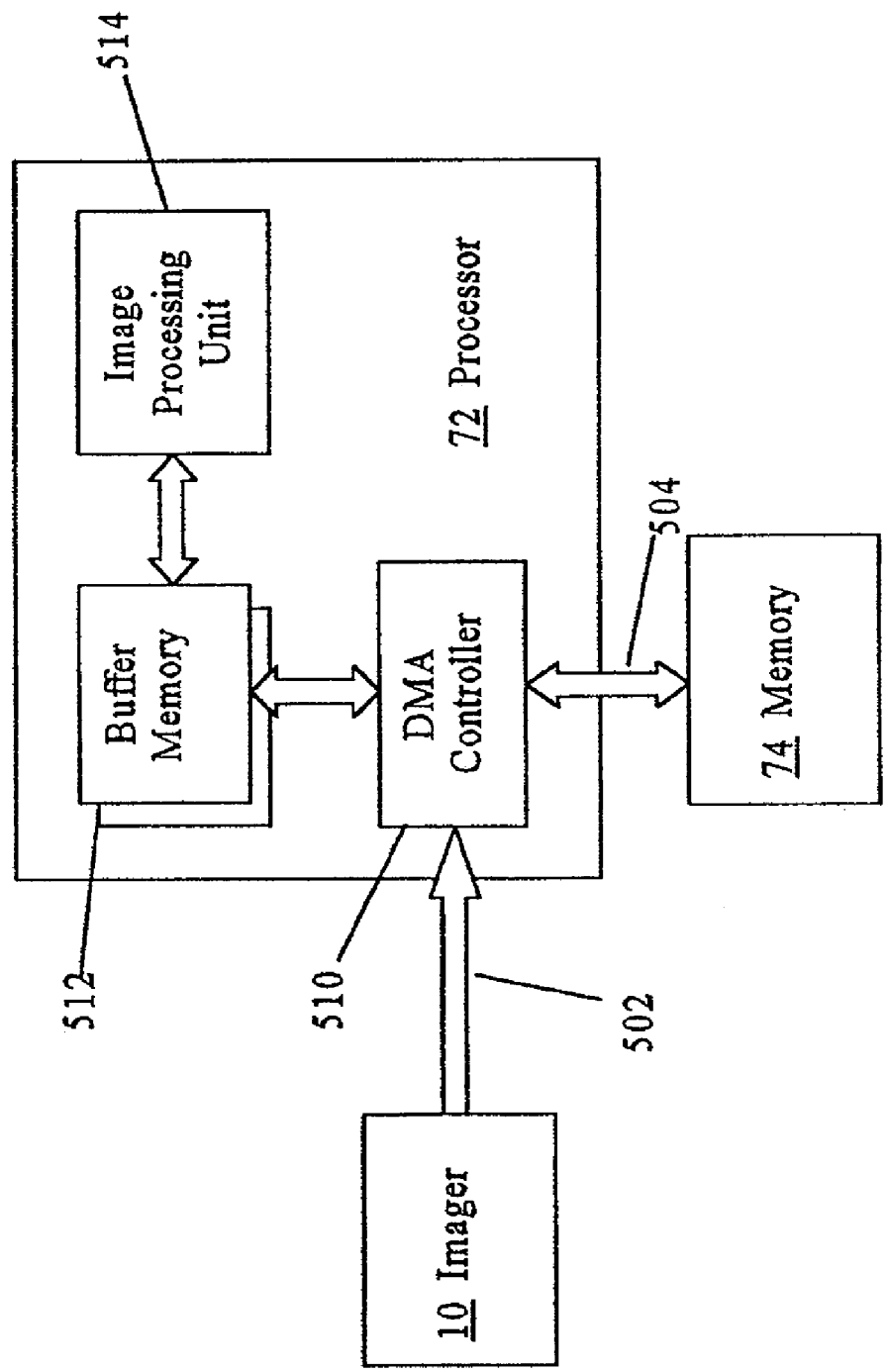
FIG. 26 is a schematic of an alternate embodiment of an external processor.

FIG. 26 discloses an external processor that contains a DMA controller 510, buffer memory 512 and a image processing unit 514. The image sensor 10 is connected to the DMA controller 510. The DMA controller 510 of the processor transfers the first and second image data to the memory 74 in an interleaved or concatenated manner. The DMA controller 510 can also transfer image data to the buffer memory 512 for processing by the image processing unit 514.

FIGS. 27A-F, 28 and 29 show another embodiment where images having different exposure periods are combined to provide a final image. The images for each exposure are referred to as images A, B, D and F.

The exposure durations from the first image to the last image may change from longer to shorter, such that the exposure rate of the first image is longer than the exposure rate of the fourth image. Each exposure may be made a power-of-two times as long as the short exposure. For example, if there are 4 exposures, and the shortest exposure lasts 3 line periods, the next longer exposure may last 3 times 2, i.e. 6 line periods, the next longer may last 6 times 4, i.e. 24 line periods, and the longest 24 times 4, i.e. 96 line periods.

FIGS. 27A-F illustrate the reading of rows in the pixel array for 4 images A, B, D, and F of different exposure durations. Image B has an exposure duration of j line periods. Image D has an exposure duration of k line periods, and image F l line periods. A line period is the interval from when each image starts to read one row to when it starts to read the next row. Each image starts exposure within the same line period and on the same row that the prior image ends exposure and read out.

Figure 27C:
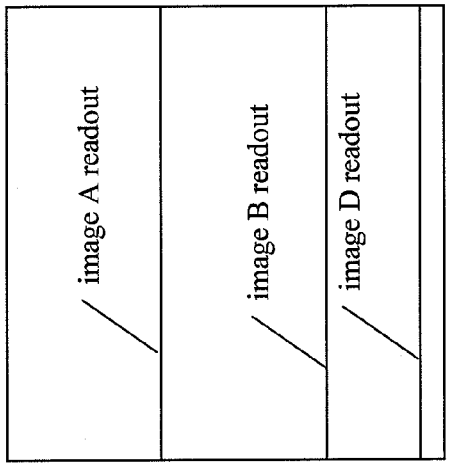
FIGS. 27A-F are illustrations showing a progressive technique for reading images A, B, D and F from a pixel array.
Figure 27F:
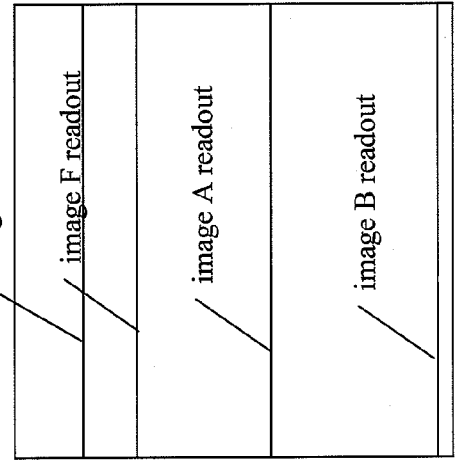
Figure 27B:
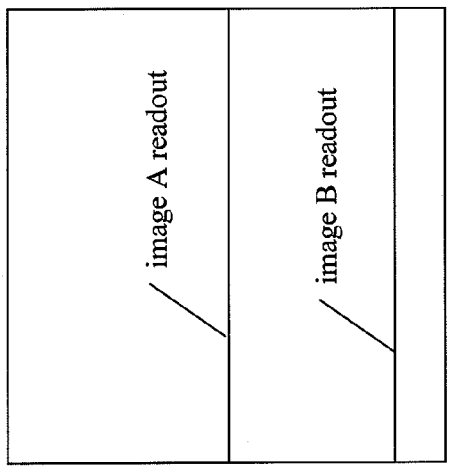
Figure 27E:
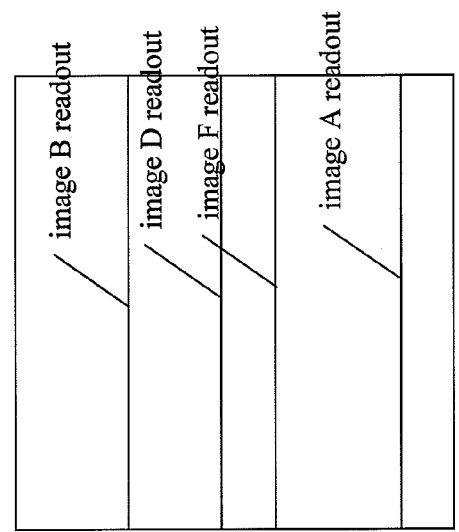
Figure 27A:
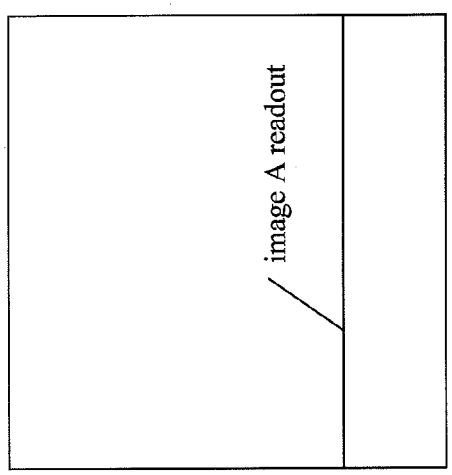
Figure 27D:
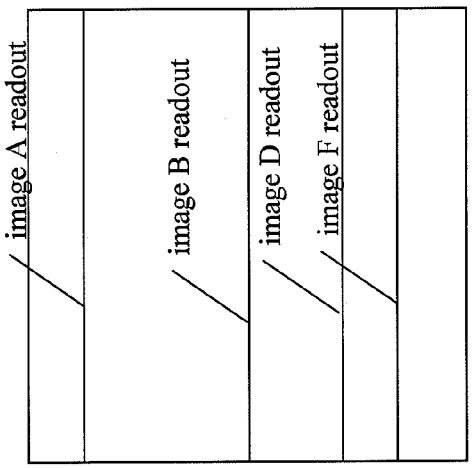

The process begin in FIG. 27A where the image A is read out of the pixel array. As shown in FIG. 27B, image B is then also read out of the array, trailing j rows behind image A. The D and F images are subsequently read out as shown in FIGS. 27C and D, respectively. The image A re-starts reading at the bottom of the pixel array and the image B re-starts reading at the bottom of the pixel array, trailing j rows behind image A as shown in FIGS. 27E and F, respectively. The images can be stored in memory in a circular buffer fashion. The memory may have separate pointers that move through memory addresses to write and read data in a manner similar to the progression shown in FIGS. 27A-F. The memory may be configured so that certain blocks of memory are allocated to certain images. For example, the memory may have a block of data for A images and a different block for B images. The data may be written and read in a circular manner within each block.

Figure 28:
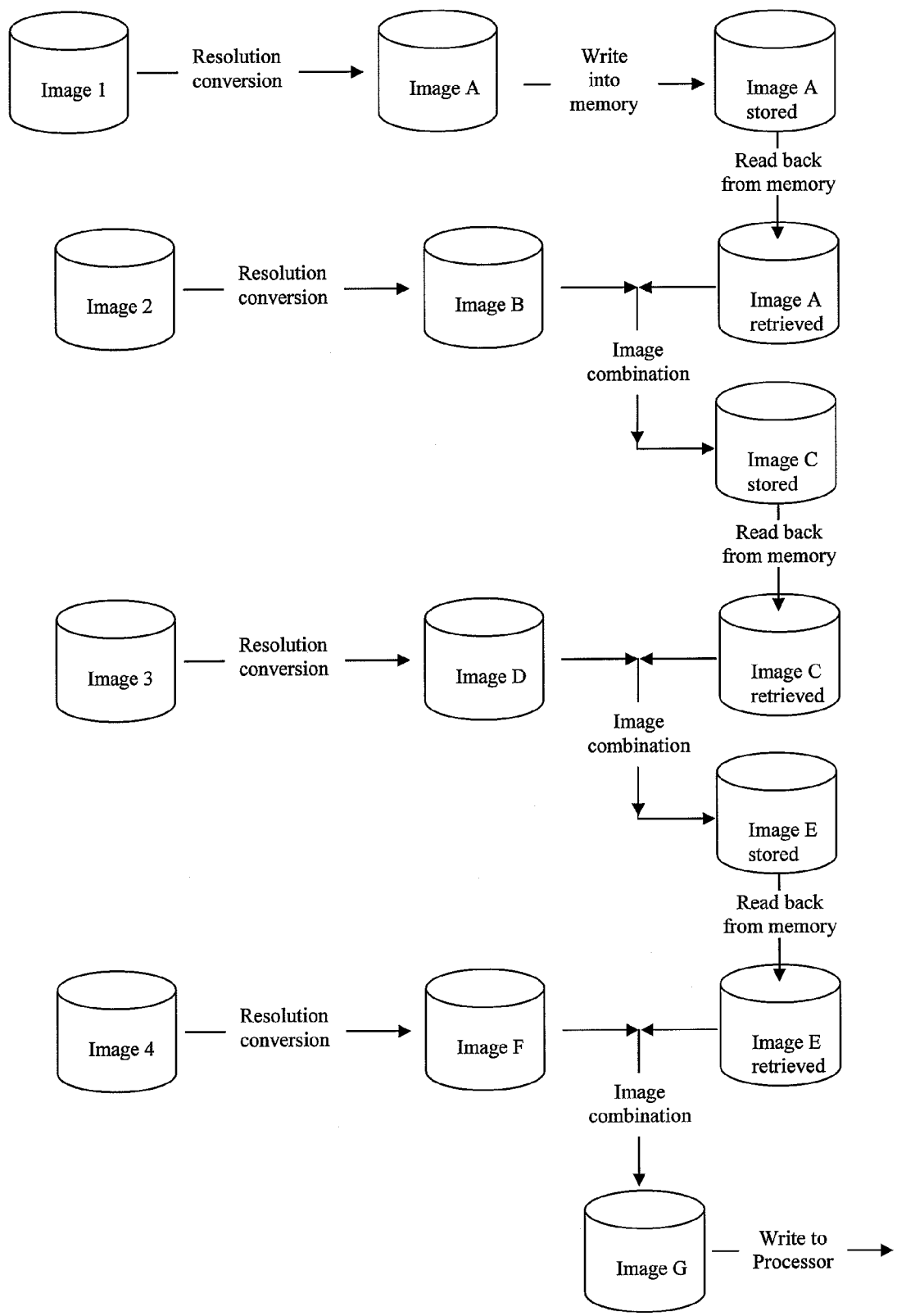
FIG. 28 is an illustration of a method for retrieving and combining pixel data.

FIG. 28 illustrates a process to combine data to create a final image G. The image A is read from memory and combined with image B read from the pixel array to create image C. In case of video, images A and B may be processed through a resolution conversion circuit. The combined image C is stored into memory in a manner that may over-write the image A in memory.

The image C is then read from memory and combined with an image D that is read from the pixel array to create an image E. In case of video, image D may have been processed through a resolution conversion circuit. Image D's readout row pixel data is combine with image C's combined row pixel data read-back for the same row. The combined image E is stored into memory in a manner that may overwrite the C image in memory. The image E is read from memory and combined with an image F read from the pixel array to create a final image G. In case of video, the image F may be processed through a resolution conversion circuit. The combined image G is written to the processor.

Figure 29:
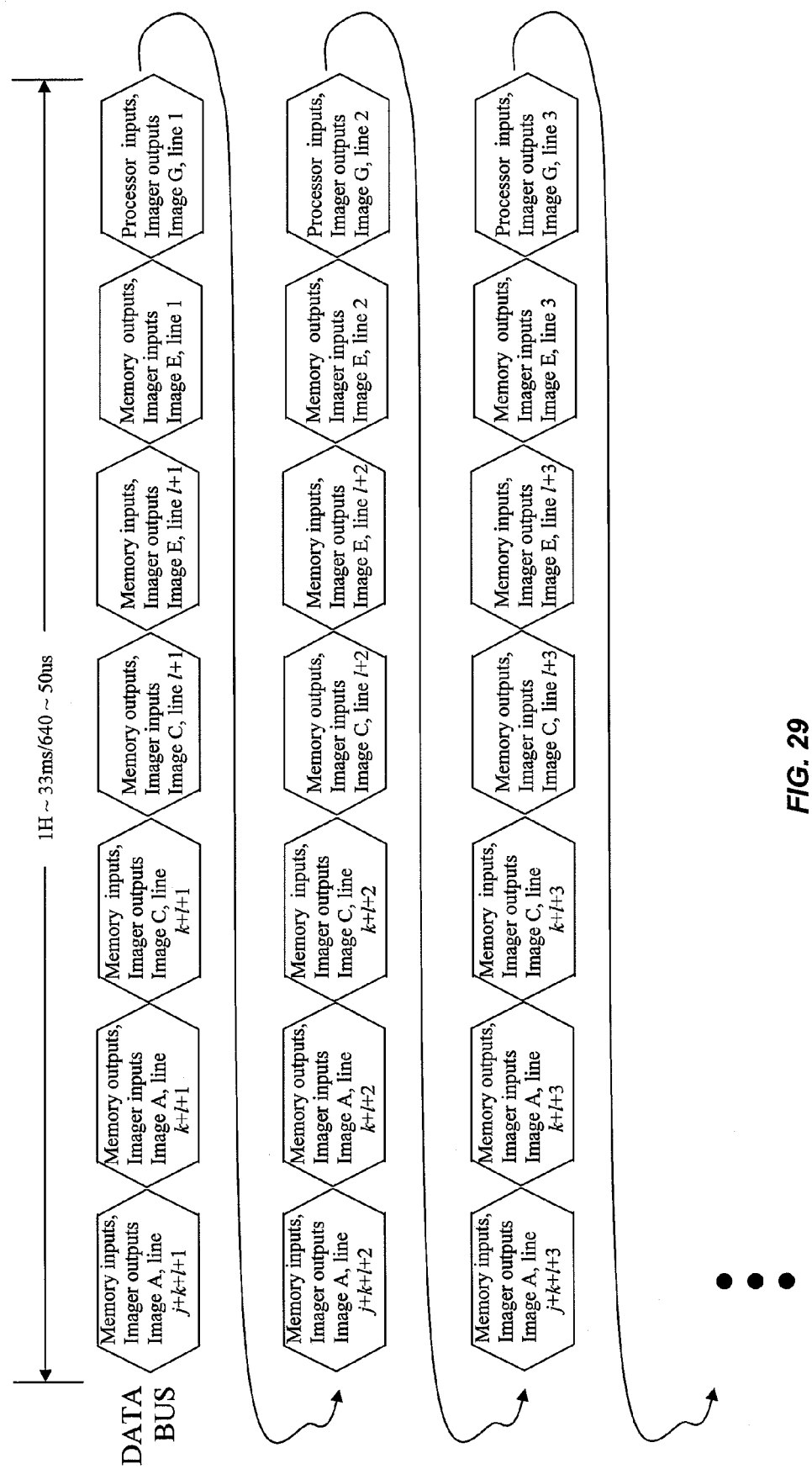
FIG. 29 is an illustration of a method for writing and reading data on a data bus within a line period.

FIG. 29 illustrates a flow of data traffic on the data bus 68 in FIG. 1 or FIG. 23b, or 70" in FIG. 23a. As shown in FIG. 29 in one line period (1H) raw image A line j+k+l+1, combined image C line k+l+1, and combined image E line l+1 are written to memory; and raw image A line k+l+1, combined image C line l+1, and combined image E line 1 are read back from memory. The combined image G line 1 is also writes to the processor in the same line period. In general, in one line period, image G line m is written to the processor at the end of 1H, raw image A line j+k+l+m, combined image C line k+l+m, and combined image E line l+m are written to memory; and raw image A line k+l+m, combined image C line l+m, and combined image E line m read back from memory.

Figure 30:
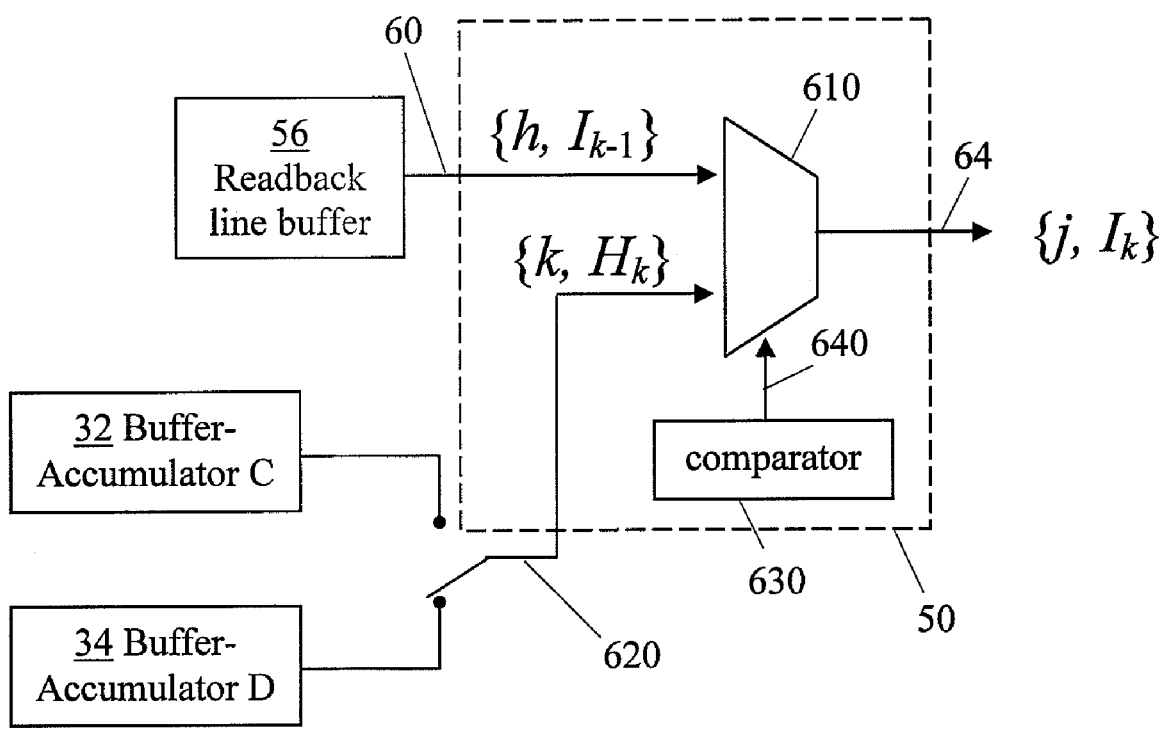
FIG. 30 is an illustration of an embodiment of a combiner.

FIG. 30 shows an embodiment of a portion of a combiner 50 that implements extended dynamic range mode. It is desirable to provide the external processor information regarding the exposure time for further processing. The combiner 50 creates a field that provides information on which of the four exposures are contained in the data provided to the processor. The field can be two or more bits in length. It is assumed for this particular embodiment that the plurality of exposure images start with the longest exposure changing progressively to shorter and shorter exposures, ending with the shortest exposure. For the example with reference to FIGS. 27-29, j>k>l.

Referring to FIG. 30, the combiner receives input from one of accumulators 32 or 34 and the readback buffer 56. The combiner 50 includes a multiplexor 610 and comparator 630. $I_k$ and $I_{k+1}$ are combined images, except $I_0$ is the first, longest exposure raw image, which in FIG. 27 is image A. $H_{k+1}$ is raw image from the pixel array or from a resolution conversion circuit. k ranges from 0 to one less than the number of exposures for forming one extended dynamic range picture. For example, $I_0$=image A, $H_1$=image B, $H_2$=image D, $H_3$=image F are the raw images, whereas $I_1$=image C, $I_2$=image E, $I_3$=image G are the combined images. The output from the combiner 50 can be stored in the readback buffer 56 (See FIG. 1).

Source label h is one number for each pixel in image $I_{k-1}$ and is previously created by the combiner 50 and written to memory during the creation of $I_{k-1}$, except in the case of $I_0$ wherein source label h is zero. Combiner output 64 $\{j, I_k\}$ is such that, for each pixel, source label j's value is either h's or k's depending on the output 640 of comparator 630.

The comparator 630 and multiplexor 610 select the shortest exposure pixel value unless it is too low (i.e. dim). It can do this by comparing the pixel value with a threshold. This decision avoids using over-exposed pixel values. If comparator 630 may provide an output that causes multiplexor 610 to select the prior combined image $I_{k-1}$'s pixel value over raw image pixel $H_k$'s value, $I_k$'s associated source label j at this pixel is assigned the source label value of h, i.e. j=h; otherwise j is assigned the value of k, i.e. j=k. For example, among the raw image sequence $I_0$ $H_1$ $H_2$ $H_3$, a j=3 in $\{j, I_3\}$ for a particular pixel means the corresponding pixel value is copied from raw image $H_3$. For each pixel, the comparator 630 compares $H_k$ with a given threshold and instructs the multiplexor 610 to output $H_k$ and source label k if $H_k \geq$ threshold, otherwise the multiplexor provides an output $I_{k-1}$ and source label h. In other words, if $H_k \geq$ threshold, j=k and $I_k$=$H_k$, otherwise j=h and $I_k$=$I_{k-1}$. By way of example the threshold value may be 50 out of a maximum of 255 if the pixel value is 8 bits and ratio of successive exposure durations is 4. The choice of threshold is preferably such that the threshold value multiplied with the ratio is less than the maximum of pixel value range.

Another method to select label j is to choose h without considering the output of the comparator 630 if the source label h of the combiner input 60 is less than k−1 for images $I_2$ and up higher. This is so because an h<k−1 indicates a prior decision by comparator 630 that raw image $H_{k-1}$ has a pixel value less than the threshold value, and hence raw image $H_k$ also has pixel value less than the threshold value at this pixel since raw image $H_k$ has even less exposure duration than raw image $H_{k-1}$.

The final combined image has, for each pixel, the pixel value and its associated source label, which informs the processor of the exposure ratio relative to the longest first image exposure associated with the pixel value. In the final step, combiner 50 generates $\{j, I_k\}$ for the last combined image from penultimate combined image $I_{k-1}$ and the last raw image $H_k$. The last combined image and its source labels $\{j, I_k\}$ may be output to the external processor 72 on data bus 68, or processed within combiner 50, to generate a high dynamic range linear image.

To form a high dynamic range linear image from the final combined image $\{j, I_k\}$, the pixel values are initially linearized to removed distortions introduced into the light-to-digital conversion process of received light causing digital pixel values. Such sources include PN-junction capacitance variation with bias voltage at the sensing node, threshold voltage variation at the source-follower transistor in the pixel due to body effect, and changes in other analog circuit characteristics due to pixel output voltage change. These variations as a function of pixel output voltage can be characterized and measured either in the factory on by an on-chip self-calibration circuit as is common practice in analog integrated circuit design practice. The result of such calibration can be a linearizing lookup table. Combiner 50 can include one such lookup table. To linearize a pixel value, the combiner 50 inputs this value into the lookup table and receives an output which is the linearized pixel value with distortions removed. The linearized pixel value is directly proportional to exposure duration times light intensity impinging on the pixel array. Linearized pixel values are then scaled inversely proportional to how much their corresponding raw images' exposure durations are scaled with respect to the first, longest exposure image. For example, if a pixel's source label is 2, and the ratio of exposure duration is 1-to-2 for $3^{rd}$ raw image to $2^{nd}$ raw image, and 1-to-3 for $2^{nd}$ raw image to first raw image, then the ratio is 1-to-6 for $3^{rd}$ raw image to $1^{st}$ raw image, and thus the linearized pixel value is to be multiplied by 6 to produce high dynamic range linear pixel value.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

For example, although interleaving techniques involving entire lines of an image are shown and described, it is to be understood that the data may be interleaved in a manner that involves less than a full line, or more than one line. By way of example, one-half of the first line of image A may be transferred, followed by one-half of the first line of image B, followed by the second-half of the first line of image A, and so forth and so on. Likewise, the first two lines of image A may be transferred, followed by the first two lines of image B, followed by the third and fourth lines of image A, and so forth and so on.

Additionally, the memory 74 may be on the same integrated circuit (on board) as the image sensor 14.

What is claimed is:

1. A method for determining whether a third image pixel that is part of an image generated from a pixel array of an image sensor and comprising a plurality of image pixels, each having an image pixel value formed from a respective reset level generated in said pixel array, has suffered a darkening resulting from a drop in its reset level prior to sampling due to a high intensity illumination, the method comprising:

finding, within said image sensor or within a processor coupled to said image sensor, a first image pixel among the plurality of image pixels whose reset level is detected to have crossed a threshold;

finding a second image pixel among the plurality of image pixels that has a saturated image pixel value, the third image pixel being located between the first and second image pixels; and, determining that the third image pixel has suffered the darkening where its image pixel value is not saturated and where there is not an intervening image pixel among the plurality of image pixels that is located between the first and the third image pixels and that either has its image pixel value saturated or has its reset level detected to have crossed a threshold.

2. The method of claim 1, further comprising correcting the image pixel value of the third image pixel to remove the darkening.

3. The method of claim 1, wherein each one of the plurality of image pixels whose reset level has crossed a threshold is given a reserved code, such that said finding the first image pixel comprises finding an image pixel that has the reserved code, and that detecting whether the intervening image pixel is formed from a reset level that crosses a threshold comprises determining whether the intervening image pixel has the reserved code.

4. The method of claim 1, wherein the third image pixel is encountered after the first image pixel in a scan in a scan direction and is encountered after the second image pixel in another scan in an opposite scan direction.

5. A method for generating an image from a pixel array in an image sensor where a reset signal that undergoes a sampling to generate an image pixel value for an image pixel of the image changes prior to the sampling due to a high intensity illumination, comprising:

setting the image pixel value to a digital reserved codeword if the reset signal is detected to have crossed a predetermined threshold, the digital reserved codeword being otherwise avoided on the image pixel value.

* * * * *